(12) United States Patent
Sasaki

(10) Patent No.: US 8,725,887 B2
(45) Date of Patent: May 13, 2014

(54) LICENSE MANAGEMENT SYSTEM AND FUNCTION PROVIDING DEVICE

(75) Inventor: Koji Sasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 189 days.

(21) Appl. No.: 13/279,641

(22) Filed: Oct. 24, 2011

(65) Prior Publication Data

US 2012/0110198 A1    May 3, 2012

(30) Foreign Application Priority Data

Oct. 29, 2010    (JP) ................................. 2010-243126

(51) Int. Cl.
*G06F 15/16*    (2006.01)
(52) U.S. Cl.
USPC ......................................................... 709/229
(58) Field of Classification Search
USPC ................ 709/219, 228, 217, 220, 225, 227; 726/100
See application file for complete search history.

(56) References Cited

U.S. PATENT DOCUMENTS

| | | | |
|---|---|---|---|
| 6,915,278 B1 * | 7/2005 | Ferrante et al. ................. | 705/59 |
| 2002/0032763 A1 * | 3/2002 | Cox et al. ....................... | 709/223 |
| 2004/0177248 A1 * | 9/2004 | Yoshida ........................ | 713/155 |
| 2006/0075110 A1 * | 4/2006 | Seraphin ....................... | 709/227 |
| 2007/0265976 A1 * | 11/2007 | Helfer et al. ................... | 705/59 |
| 2007/0299845 A1 * | 12/2007 | Tokunaga .......................... | 707/9 |
| 2008/0235141 A1 * | 9/2008 | Hilerio et al. .................. | 705/59 |
| 2009/0249448 A1 * | 10/2009 | Choi et al. ........................ | 726/4 |
| 2009/0288149 A1 * | 11/2009 | Kolluru et al. .................... | 726/5 |
| 2009/0299791 A1 * | 12/2009 | Blake et al. ........................ | 705/8 |
| 2010/0023412 A1 * | 1/2010 | Kitagawa et al. ............... | 705/26 |
| 2010/0031316 A1 * | 2/2010 | Taniguchi .......................... | 726/3 |
| 2010/0125894 A1 * | 5/2010 | Yasrebi et al. ..................... | 726/4 |
| 2010/0281173 A1 * | 11/2010 | Vutukuri et al. ............... | 709/228 |
| 2011/0161506 A1 * | 6/2011 | Dickerson ..................... | 709/228 |
| 2011/0202433 A1 * | 8/2011 | Yokoyama ..................... | 705/28 |
| 2011/0213843 A1 * | 9/2011 | Ferrazzini et al. ............ | 709/206 |
| 2011/0276501 A1 * | 11/2011 | Sako et al. ..................... | 705/310 |
| 2012/0072718 A1 * | 3/2012 | Ronda et al. .................. | 713/156 |
| 2012/0221955 A1 * | 8/2012 | Raleigh et al. ................ | 715/736 |
| 2013/0054685 A1 * | 2/2013 | Yamamoto ..................... | 709/203 |

FOREIGN PATENT DOCUMENTS

| | | |
|---|---|---|
| JP | 2006-146740 | 6/2006 |
| JP | 2010-72875 | 4/2010 |
| WO | WO 9911019 A1 * | 3/1999 |

* cited by examiner

*Primary Examiner* — Ario Etienne
*Assistant Examiner* — Uzma Alam
(74) *Attorney, Agent, or Firm* — Oblon, Spivak, McClelland, Maier & Neustadt, L.L.P.

(57) ABSTRACT

A function providing device provides a function to an information processing device. The function providing device is connected to a license management device that manages a connection license which allows the information processing device to use the function. The function providing device determines, when a connection request is received from the information processing device, whether the information processing device is assigned with a connection license; sends a connection license assignment determination request to the license management device when the information processing device making the connection request is determined as not being assigned with a connection license; and controls whether to authorize connection of the information processing device based on a determination result obtained at the determining or a determination result received from the license management device indicating whether a connection license is assigned to the information processing device making the connection request.

15 Claims, 19 Drawing Sheets

| CLIENT IDENTIFICATION | CONNECTION RECORD |
|---|---|
| ClientA | 2010/09/14 11:20:00 |
| ClientB | 2010/09/02 09:10:32 |
| ClientC | 2010/08/27 13:00:24 |
| .... | .... |

FIG.5

| LICENSE IDENTIFICATION | CLIENT IDENTIFICATION | CROSSCHECK RECORD |
|---|---|---|
| 1 | ClientA | 2010/09/14 11:20:00 |
| 2 | ClientB | 2010/09/02 09:10:32 |
| 3 | ClientC | 2010/08/27 13:00:24 |
| 4 | ClientD | 2010/09/11 15:06:33 |
| 5 | ClientE | 2010/08/15 11:24:45 |
| ... | ... | ... |

51D

LICENSE MANAGEMENT SYSTEM AND FUNCTION PROVIDING DEVICE

BACKGROUND OF THE INVENTION

1. Field of the Invention

The present invention relates to a technology of managing licenses for a connected device in a system by using a device having a server function.

2. Description of the Related Art

For example, patent document 1 discloses a technology of implementing a function (service) for integrally managing usage licenses of software items of a server. Specifically, the server is provided with a license management table for managing the usage of software items included in the server by each user.

Patent document 1 indicates an example where a license is used when a software item in the server is used by a client. Similarly, in a server-client type system, a license (hereinafter, "connection license") is used when the client connects to a server.

The following describes operation formats of a connection license. For example, the servers have connection licenses, and the number of clients that can access each server is controlled. In another example, the clients have connection licenses, and the server only allows a client having the connection license to connect to the server.

In conventional systems, fraudulent connections from clients (connections with the use of fraudulent licenses) are prevented by the above operation formats.

However, the conventional method has the following problem. That is, when the servers have connection licenses, a single connection license is not applicable to a client attempting to connect to plural servers. For example, in a large-scale system, plural servers are provided in the system, and these servers provide functions to client. In this case, in the conventional method, a connection license is assigned to the client by each server. That is to say, the client cannot use functions provided from plural servers with the use of a single connection license.

Patent Document 1: Japanese Laid-Open Patent Publication No. 2006-146740

SUMMARY OF THE INVENTION

The present invention provides a license management system and a function providing device, in which one or more of the above-described disadvantages are eliminated.

A preferred embodiment of the present invention provides a license management system and a function providing device with which a client can use functions provided by plural servers with the use of a single connection license.

According to an aspect of the present invention, there is provided a license management system including function providing devices configured to provide functions to an information processing device to be connected to the function providing devices; and a license management device configured to manage connection licenses which allow the information processing device to use the functions of the function providing devices, wherein the function providing devices and the license management device are connected by a predetermined data transmission path, wherein each of the function providing devices includes a connection device determination unit configured to determine, when a connection request is received from the information processing device, whether the information processing device making the connection request is an information processing device that is assigned with a connection license, and a determination request sending unit configured to send a connection license assignment determination request to the license management device when the information processing device making the connection request is determined as not being an information processing device that is assigned with a connection license, wherein the license management device includes a connection license determination unit configured to determine whether a connection license is assigned to the information processing device making the connection request, and a determination result sending unit configured to send a determination result of the connection license determination unit to the function providing device making the connection license assignment determination request, wherein each of the function providing devices controls whether to authorize connection of the information processing device making the connection request based on a determination result of the connection device determination unit or the determination result sent by the determination result sending unit.

According to an aspect of the present invention, there is provided a function providing device that provides a function to an information processing device, the function providing device being connected, by a predetermined data transmission path, to a license management device configured to manage a connection license which allows the information processing device to use the function of the function providing device, the function providing device including a connection device determination unit configured to determine, when a connection request is received from the information processing device, whether the information processing device making the connection request is an information processing device that is assigned with a connection license; and a determination request sending unit configured to send a connection license assignment determination request to the license management device when the information processing device making the connection request is determined as not being an information processing device that is assigned with a connection license, wherein the function providing device controls whether to authorize connection of the information processing device making the connection request based on a determination result of the connection device determination unit or a determination result received from the license management device indicating whether a connection license is assigned to the information processing device making the connection request.

According to an aspect of the present invention, there is provided a non-transitory computer-readable storage medium storing a program which, when executed by a computer, causes a function providing device to execute a method, the function providing device providing a function to an information processing device, the function providing device being connected, by a predetermined data transmission path, to a license management device configured to manage a connection license which allows the information processing device to use the function of the function providing device, the method including determining, when a connection request is received from the information processing device, whether the information processing device making the connection request is an information processing device that is assigned with a connection license; sending a connection license assignment determination request to the license management device when the information processing device making the connection request is determined as not being an information processing device that is assigned with a connection license; and controlling whether to authorize connection of the information processing device making the connection request based on a determination result obtained at the determining or a determination result received from the license management device indicating whether a connection license is assigned to the information processing device making the connection request.

BRIEF DESCRIPTION OF THE DRAWINGS

Other objects, features and advantages of the present invention will become more apparent from the following detailed description when read in conjunction with the accompanying drawings, in which:

FIG. 4 indicates an example of license related information (cache information) according to the first embodiment of the present invention;

FIG. 5 indicates an example of data of license management information according to the first embodiment of the present invention;

DETAILED DESCRIPTION OF THE PREFERRED EMBODIMENTS

A description is given, with reference to the accompanying drawings, of embodiments of the present invention.

First Embodiment

System Configuration

Figure 1:
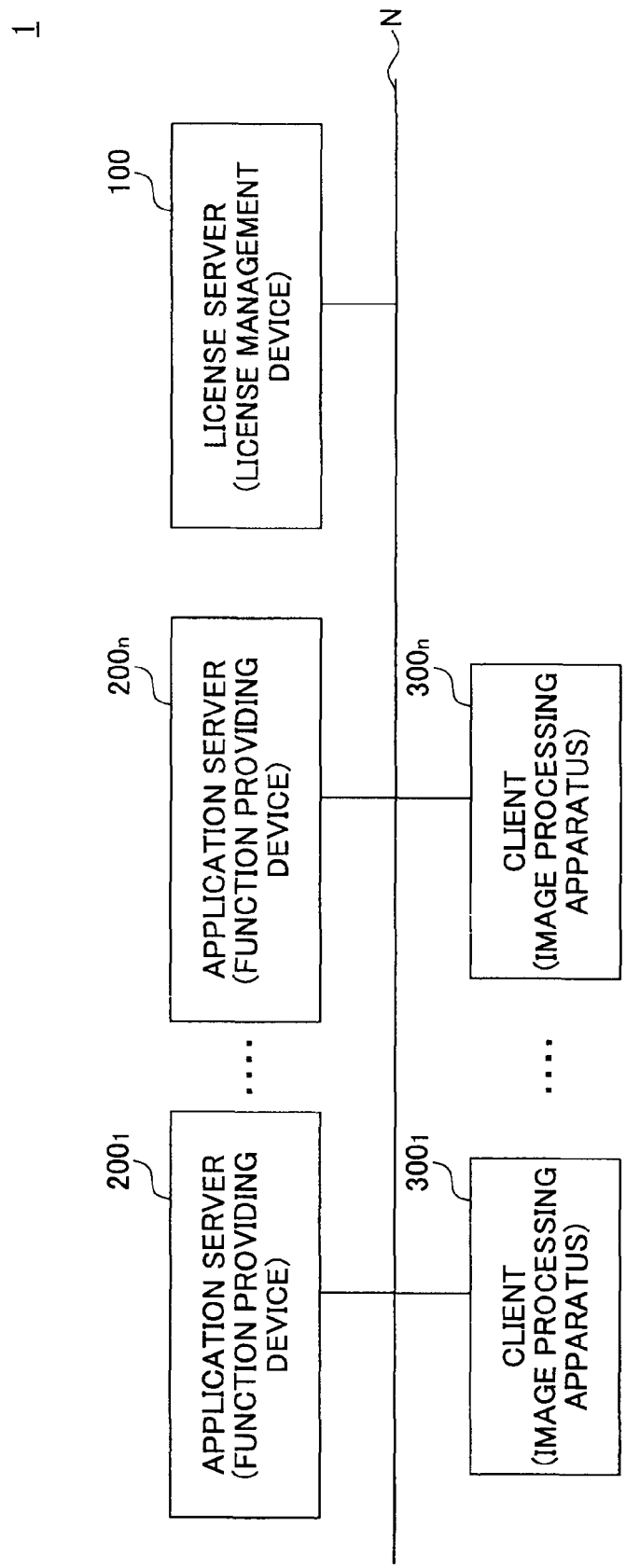
FIG. 1 illustrates an example of a configuration of a license management system according to a first embodiment of the present invention.

FIG. 1 illustrates an example of a configuration of a license management system 1 according to a first embodiment.

FIG. 1 illustrates a system configuration in which a license server 100, plural application servers $200_1$ through $200_n$ (also collectively referred to as "application server 200"), and plural clients $300_1$ through $300_n$ (also collectively referred to as "client 300") are connected to each other via a data transmission line N such as a network (e.g., "LAN: Local Area Network").

The license server 100 is a server device (license management device) that collectively manages the connection licenses for the clients 300. A connection license is authentication information used by the application server 200 to determine whether to allow a function to be provided to the client 300. Accordingly, the license server 100 assigns (issues) a connection license (authentication information) for a client 300 that is allowed to be provided with a function. The application server 200 is a server device (function providing device) for providing a function to the client 300 by executing an installed application. The license server 100 and the application server 200 are information processing devices such as PCs (Personal Computers). The client 300 is a device that connects to the application server 200 to receive a function.

In the present embodiment, a pull print function is taken as an example of the function that is provided from the application server 200 to the client 300. Thus, the client 300 is assumed to be an image processing apparatus such as an MFP (Multifunction Peripheral).

The pull print function is a function that is implemented between the application server 200 and the client 300, by executing cooperative processing as described below. The client 300 receives a job execution request (including specification of an execution target job) from a user. In accordance with the request, the client 300 acquires a print job specified at the time of the request from the application server 200 in which the print job is stored. Accordingly, the client 300 executes the acquired print job.

In the present embodiment, one client 300 can connect to plural application servers 200. That is to say, in the present embodiment, the client 300 can use functions provided from plural application servers 200.

Accordingly, in the license management system 1 according to the present embodiment, the license server 100 is provided so that the connection licenses assigned to the clients 300 are collectively managed and cooperative processing is performed between the license server 100 and the respective application servers 200 to manage the connection licenses (inter-server processing).

As described above, the license management system 1 according to the present embodiment has the above system configuration, and thus provides an environment in which the client 300 can use functions provided from plural application servers 200 with a single connection license.

The above describes the operation of the license management system 1 according to the present embodiment taking a pull print function as an example, and therefore, the client 300 is assumed to be an image processing apparatus. However, the present invention is not so limited. For example, the device that receives a function from the application server 200 may be an information processing apparatus such as a user terminal.

Hardware Configuration

Next, a description is given of a hardware configuration of the license server 100 and the application server 200 according to the present embodiment. The license server 100 and the application server 200 are both information processing apparatuses having the same configuration. In the following, the license server 100 is taken as an example for describing the hardware configuration of the information processing apparatus.

Figure 2:
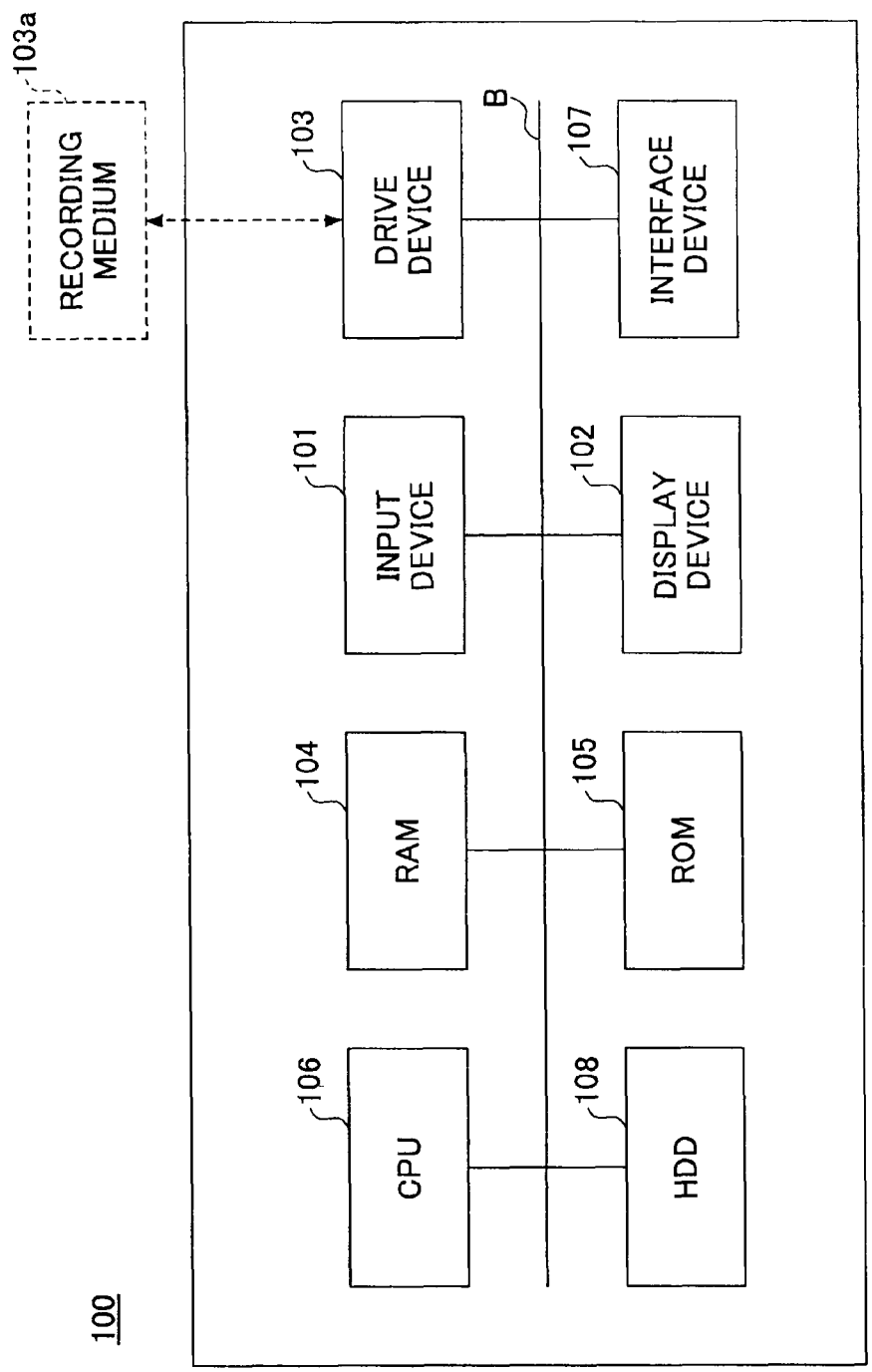
FIG. 2 illustrates an example of a hardware configuration of a license server according to the first embodiment of the present invention.

FIG. 2 illustrates an example of a hardware configuration of an information processing apparatus according to the present embodiment.

As shown in FIG. 2, the license server 100 includes an input device 101, a display device 102, a drive device 103, a RAM (Random Access Memory) 104, a ROM (Read Only Memory) 105, a CPU (Central Processing Unit) 106, an interface device 107, and a HDD (Hard Disk Drive) 108, which are interconnected by a bus B.

The input device 101 includes a keyboard and a mouse, and is used for inputting various operation signals in the license server 100. The display device 102 includes a display, and displays processing results obtained by the license server 100.

The interface device 107 is an interface for connecting the license server 100 to the data transmission line N. Accordingly, the license server 100 can perform data communication with the application server 200 and the client 300 via the interface device 107.

The HDD 108 is a non-volatile storage device storing programs and data. The stored programs and data include an information processing system for controlling the entire device (for example, an OS (Operating System) which is basic software, such as "Windows" (trademark or registered trademark) or "UNIX" (trademark or registered trademark)), and applications for providing various functions in the system (for example, a "job managing function"). Furthermore, the HDD 108 manages the stored programs and data with the use of a predetermined file system and/or a DB (database).

The drive device 103 is an interface for a removable recording medium 103*a*. Accordingly, the license server 100 can read from or write in the recording medium 103*a* via the drive device 103. The recording medium 103*a* may be, for example, a floppy (trademark or registered trademark) disk, a CD (Compact Disk), a DVD (Digital Versatile Disk), an SD memory card, and a USB (Universal Serial Bus) memory.

The ROM 105 is a non-volatile semiconductor memory (storage device) that can store internal data even after the power is turned off. The ROM 105 stores programs and data such as BIOS (Basic Input/Output System) that is executed when the license server 100 is activated, information processing system settings, and network settings. The RAM 104 is a volatile semiconductor memory (storage device) that temporarily stores programs and data. The CPU 106 is a processing device for controlling the entire device and implementing installed functions by loading the programs and data in the storage device (for example, the HDD 108 and the ROM 105) into the RAM 104 and executing processes.

As described above, in the license server 100 according to the present embodiment, a license management function can be provided by the above hardware configuration.

License Management Function

A description is given of a license management function according to the present embodiment.

In the license management system 1 according to the present embodiment, service cooperative processing is executed as follows. First, when a connection request is received from a client 300 (requesting client 300), the application server 200 refers to information relevant to the clients 300 to which connection licenses are assigned (cache information of the connection license), and determines whether the requesting client 300 is a client 300 that is assigned with a connection license. If the application server 200 determines that the requesting client 300 is not a client 300 that is assigned with a connection license, the application server 200 requests the license server 100 to determine whether a connection license is assigned to the requesting client 300. In response to the determination request, the license server 100 refers to the management information in which the connection licenses are managed, and determines whether a connection license is assigned to the requesting client 300. The license server 100 returns a determination result to the application server 200. Accordingly, the application server 200 controls whether the requesting client 300 can be connected, based on the determination result. The license management system 1 according to the present embodiment has the above-described license management function.

In the conventional method, when the application server 200 for providing a function to the client 300 has the connection license, a single connection license is not applicable for a client 300 attempting to connect to plural application servers 200.

For example, in a large-scale system, plural application servers 200 are provided in the system, and these application servers 200 provide functions to the client 300. In this case, in the conventional method, a connection license is assigned to the client 300 by each application server 200. That is to say, the client 300 cannot use functions provided from plural application servers 200 with the use of a single connection license.

Meanwhile, in the license management system 1 according to the present embodiment, the process of managing the connection licenses assigned to the clients 300 is executed in a cooperative manner between the application server 200 and the license server 100 (inter-server processing).

Thus, in the license management system 1 according to the present embodiment, the client 300 can use functions provided from plural application server 200 with a single connection license.

A description is given of a configuration and operations of the license management function according to the present embodiment.

Figure 3:
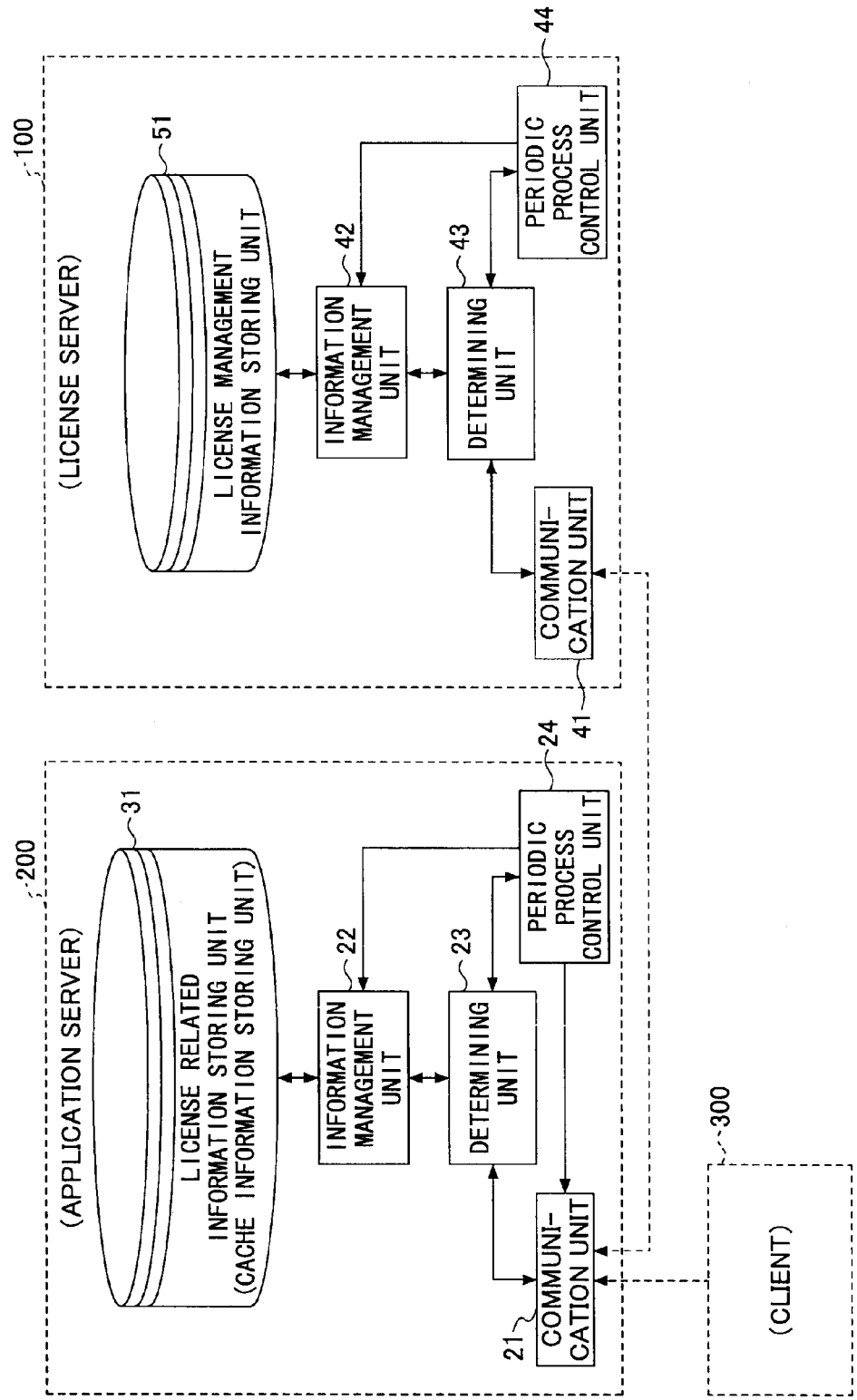
FIG. 3 illustrates an example of a functional configuration of the license management system according to the first embodiment of the present invention.

FIG. 3 illustrates an example of a functional configuration of the license management system 1 according to the present embodiment.

As shown in FIG. 3, the functional configuration of the license management system 1 according to the present embodiment is broadly divided into functions of the application server 200 and functions of the license server 100.

Application Server

The application server 200 includes a communication unit 21, an information management unit 22, a determining unit 23, a periodic process control unit 24, and a license related information storing unit 31.

The communication unit 21 is a function unit for performing data communication with other devices connected to the license management system 1. The other devices connected to the license management system 1 include the license server 100 and the client 300. The communication unit 21 controls the interface device 107 according to, for example, network setting information (IP address (Internet Protocol Address) that is set in advance, to perform data communication with the license server 100 and the client 300.

The above data communication includes sending (reporting) a processing request to the license server 100 and receiving a connection request from the client 300.

The information management unit 22 is a function unit for managing information (hereinafter, "license related information") relevant to the clients 300 assigned with connection licenses among the clients 300 that have sent connection requests to the application server 200. The license related information is stored in the license related information storing unit 31. For example, the license related information storing unit 31 corresponds to a predetermined storage area in a storage device (RAM) provided in the application server 200.

According to a data operation request received from another function unit, the information management unit 22 accesses the license related information storing unit 31 and performs various data operations that have been requested, to manage information. The various data operations are, for example, data setting (writing), searching, acquiring, changing (updating), and deleting (erasing).

A description is given of license related information.

FIG. 4 indicates an example of license related information (cache information) 31D according to the present embodiment.

As shown in FIG. 4, the license related information 31D includes client identification and connection records in association with each other.

The client identification field includes information for identifying the clients 300 (hereinafter, "client identification information"). The values of the information items are data such as a device name or an IP address uniquely assigned to each client 300. The connection record field includes information indicating the connection record (connection record information) of each client 300. The values of the information items are data such as a date and time.

The information management unit 22 sets the above values as follows. The information management unit 22 sets, as the client identification item, the device name of the client 300 assigned with a connection license, among the clients 300 that have sent connection requests to the application server 200. Furthermore, the information management unit 22 sets, as the connection record item, the last time the client 300 connected to the application server 200. Specifically, the information management unit 22 sets the data of the last connection time as the connection record item in association with the client identification item, based on the client identification information of the requesting client 300.

The information management unit 22 performs the operations of searching, acquiring, updating, or deleting the above item values, as follows. The information management unit 22 searches, acquires, updates, or deletes the data by referring to the license related information 31D based on the client identification information of the requesting client 300.

The determining unit 23 is a function unit for performing various determination processes on the client 300. The various determination processes include the following.

The determining unit 23 determines whether the client 300 from which the connection request is received via the communication unit 21 (the client 300 that sent a connection request to the application server 200) is a client 300 that is assigned with a connection license. The determining unit 23 refers to the license related information 31D via the information management unit 22 based on the client identification information of the requesting client 300, and searches for corresponding data. When the corresponding data is found in the search results (when there is corresponding data in the license related information 31D), the determining unit 23 determines that the requesting client 300 is a client 300 that is assigned with a connection license. In this case, the determining unit 23 sends (reports) authorization to be connected to the requesting client 300 via the communication unit 21. The determining unit 23 passes, to the information management unit 22, the client identification information of the requesting client 300 that is allowed to be connected, and requests the information management unit 22 to update the connection record information corresponding to the requesting client 300, in the license related information 31D.

Meanwhile, when the corresponding data is not found in the search results (when there is no corresponding data in the license related information 31D), the determining unit 23 determines that the requesting client 300 is not a client 300 that is assigned with a connection license. In this case, the determining unit 23 sends (reports), to the license server 100 via the communication unit 21, a request to determine whether a connection license is assigned to the requesting client 300. Based on a processing result returned from the license server 100, the determining unit 23 determines whether the requesting client 300 is a client 300 that is assigned with a connection license or a client 300 that is assigned with a new connection license, at the license server 100.

When the requesting client 300 is determined to be either a client 300 that is assigned with a connection license or a client 300 that is assigned with a new connection license, the determining unit 23 passes the client identification information of the requesting client 300 to the information management unit 22, and requests the information management unit 22 to update the license related information 31D. Accordingly, in the license related information 31D, the connection record information of the client 300 determined as being assigned with a connection license, is updated. Furthermore, in the license related information 31D, the client identification information and the connection record information of the client 300 determined as being assigned with a new connection license, is updated.

As described above, in the application server 200 according to the present embodiment, if the requesting client 300 is not set in the license related information 31D, the application server 200 requests the license server 100 to perform a determination process to determine whether a connection license is assigned to the requesting client 300. Based on a processing result returned from the license server 100, the application server 200 sets/registers the requesting client 300 in the license related information 31D. Furthermore, the application server 200 issues authorization of connection for the requesting client 300, based on data of the client 300 (registered client) set in the updated license related information 31D as described above. That is to say, the license related information 31D also acts as cache information of the connection licenses managed at the license server 100.

Accordingly, in the license management system 1 according to the present embodiment, every time a connection request is received from the client 300, the application server 200 does not need inquire the license server 100, except for cases where the requesting client 300 is not set in the license related information (cache information) 31D. Thus, in the present embodiment, when a connection request is received, the communication load can be reduced and the connection processing time can be reduced.

Furthermore, in accordance to a determination request from the periodic process control unit 24 described below, the determining unit 23 determines which client 300 has not been connected for a predetermined time period, among the clients 300 (registered clients: cached clients) set in the license related information (cache information) 31D. The determining unit 23 refers to the license related information (cache information) 31D via the information management unit 22, and acquires connection record information. The determining unit 23 confirms whether a predetermined time period has passed since the last time a client 300 was connected, based on the date data in the acquired connection record information, period information indicating a predetermined time period set in advance, and the present date. As a result, when it is confirmed that the predetermined time period has passed (when there is a corresponding data item in the license related information (cache information) 31D), the determining unit 23 identifies the corresponding client 300 by the client identification information associated with the connection record information, and determines the identified client 300 as a client 300 that has not been connected for a predetermined time period.

Meanwhile, when it is confirmed that the predetermined time period has not passed (when there is no corresponding data item in the license related information (cache information) 31D), the determining unit 23 determines that there is no client 300 that has not been connected for a predetermined time period, among the clients 300 (registered clients) set in the license related information (cache information) 31D.

The determining unit 23 returns the above determination result to the periodic process control unit 24 that is the requesting source.

The periodic process control unit 24 is a function unit that periodically performs a management process on the license related information (cache information) 31D. The periodic process control unit 24 implements control so that a management process is periodically executed on the license related information (cache information) 31D. Examples of the management process are described as follows.

As described above, the periodic process control unit 24 requests the determining unit 23 determine whether there is a client 300 that has not been connected for a predetermined time period, among the clients 300 in the license related information (cache information) 31D. Based on a determination result returned from the determining unit 23, the periodic process control unit 24 passes the client identification information of the corresponding client 300 to the information management unit 22, and requests the information management unit 22 to update the license related information (cache information) 31D. Accordingly, for example, data set for a client 300 that has not been connected for a predetermined time period is deleted from the license related information (cache information) 31D.

The periodic process control unit 24 sends, to the license server 100, the license related information (cache information) 31D acquired via the information management unit 22, and requests the license server 100 to crosscheck the license related information (cache information) 31D with the management information used for managing connection licenses in the license server 100 (hereinafter, also referred to as "license management information"). Based on a processing result returned from the license server 100, the periodic process control unit 24 determines whether the updating of the management information of the client 300 has been unsuccessful, or whether the assigning of a new connection license to the client 300 has been unsuccessful, at the license server 100.

When it is determined that the updating of the management information or the assigning of a new connection license has been unsuccessful, the periodic process control unit 24 passes the client identification information of the corresponding client 300 to the information management unit 22, and requests the information management unit 22 to update the license related information (cache information) 31D. Accordingly, for example, for example, data set for a client 300 for which updating of management information has been unsuccessful or assigning of a new connection license has been unsuccessful, is deleted from the license related information (cache information) 31D.

As described above, in the license management system 1 according to the present embodiment, a matching process is performed on the license related information (cache information) 31D included in the application server 200 and the management information used for managing connection licenses in the license server 100 (license management information).

License Server

The license server 100 includes a communication unit 41, an information management unit 42, a determining unit 43, a periodic process control unit 44, and a license management information storing unit 51.

The communication unit 41 is a function unit for performing data communication with the application server 200. The communication unit 41 controls the interface device 107 according to, for example, network setting information (IP address (Internet Protocol Address) of the application server 200 that is set in advance, to perform data communication with the application server 200.

The above data communication includes receiving a processing request from the application server 200 and sending (reporting) a processing result to the application server 200.

The information management unit 42 is a function unit for managing the license management information. The license management information is stored in the license management information storing unit 51. For example, the license management information storing unit 51 corresponds to a predetermined storage area in a storage device (HDD) provided in the license server 100.

According to a data operation request received from another function unit, the information management unit 42 accesses the license management information storing unit 51 and performs various data operations that have been requested, to manage information. The various data operations are, for example, data setting (writing), searching, acquiring, changing (updating), and deleting (erasing).

A description is given of license management information.

FIG. 5 indicates an example of license management information 51D according to the present embodiment.

As shown in FIG. 5, the license management information 51D includes license identification, client identification, and crosscheck records in association with each other.

The license identification field includes information for identifying the connection licenses (hereinafter, "license identification information"). The values of the information items are data such as an ID uniquely assigned to each connection license. The client identification field includes client identification information of the clients 300. The values of the information items are data such as a device name or an IP address uniquely assigned to each client 300 that is assigned with a connection license. The crosscheck record field includes information indicating the crosscheck record (crosscheck record information) of crosschecking the client 300 with the corresponding license related information (cache information) 31D. The values of the information items are data such as a date and time when a crosscheck process is executed between the license management information 51D and the license related information (cache information) 31D.

As described above, in the license management information 51D, the connection licenses and the clients 300 assigned with the connection licenses are managed by associating the respective information items with each other.

The information management unit 42 sets the above values as follows. The information management unit 42 sets IDs of connection licenses given in advance as the license identification items. Accordingly, in the license management system 1, the number of set license identification information items corresponds to the upper limit value of assigning connection licenses to the clients 300 (upper limit value of the number of authorizations given to the clients 300 for authorizing connection).

Furthermore, the information management unit 42 performs the operations of searching, acquiring, updating, or deleting the item values of client identification and crosscheck records, as follows. The information management unit 42 searches, acquires, updates, or deletes the data by referring to the license management information 51D based on the client identification information included in the information received from the application server 200 together with the processing request.

The determining unit 43 is a function unit for performing various determination processes on the client 300, according to processing requests from the application server 200. The various determination processes include the following. The determining unit 43 determines whether a requesting client 300 is assigned with a connection license, when a request to determine whether the requesting client 300 is assigned with a connection license is received from the application server 200. The determining unit 43 refers to the license management information 51D via the information management unit 42 based on the client identification information of the requesting client 300, and searches for corresponding data. When the corresponding data is found in the search results (when there is corresponding data in the license management information 51D), the determining unit 43 determines that the requesting client 300 is a client 300 that is assigned with a connection license.

Meanwhile, when the corresponding data is not found in the search results (when there is no corresponding data in the license management information 51D), the determining unit 43 determines that the requesting client 300 is not a client 300 that is assigned with a connection license. At this time, the determining unit 43 refers to the license management information 51D, and determines whether there is a connection license that is not assigned to any client 300 (hereinafter, "surplus license"). When there is a surplus license, the determining unit 43 passes the client identification information of the requesting client 300 to the information management unit 42, and requests the information management unit 42 to update the license management information 51D by associating the license identification information of the surplus license with the client identification information of the requesting client 300. Accordingly, a new connection license is assigned to the requesting client 300.

The determining unit 43 sends (returns) the determination result (indicating whether a license is assigned/whether the new license is successfully assigned) to the application server 200 that is the processing request source via the communication unit 41.

Furthermore, when a crosscheck request of the license related information (cache information) 31D is received from the application server 200, the determining unit 43 determines whether the client 300 (registered client) set in the received license related information (cache information) 31D is entered (registered) in the license management information 51D. The determining unit 43 refers to the license management information 51D via the information management unit 42 based on the client identification information in the license related information (cache information) 31D, and searches for corresponding data. When the corresponding data is found in the search results (when there is corresponding data in the license management information 51D), the determining unit 43 determines that the client 300 (registered client) set in the license related information (cache information) 31D is a client 300 already entered in the license management information 510. In this case, the determining unit 43 passes, to the information management unit 42, the client identification information in the license related information (cache information) 31D, and requests the information management unit 42 to update the crosscheck record information corresponding to the already-entered client 300 of the license related information 31D. Accordingly, for example, in the license management information 51D, crosscheck record information of the already-entered client 300 is set, and the information in the license management information 51D relevant to the entered clients 300 is updated to be the latest information.

Meanwhile, when the corresponding data is not found in the search results (when there is no corresponding data in the license management information 51D), the determining unit 43 determines that the client 300 (registered client) set in the license related information (cache information) 31D is not entered in the license management information 51D.

In this case also, the determining unit 43 refers to the license management information 51D and determines whether there is a surplus license. When there is a surplus license, the determining unit 43 passes the client identification information of the not-entered client 300 to the information management unit 42, and requests the information management unit 42 to update the license management information 51D. Accordingly, for example, in the license management information 51D, the license identification information of the surplus license is set in association with client identification information of the not-entered client 300, a new connection license is assigned to the not-entered client 300, and the not-entered client 300 is entered (registered) in the license management information 51D.

The determining unit 43 sends (returns) the result of the crosscheck process (indicating whether the management information is successfully updated/whether the new license is successfully assigned) to the application server 200 that is the processing request source via the communication unit 41.

As described above, in the license management system 1 according to the present embodiment, a matching process is performed on the license related information (cache information) 31D included in the application server 200 and the license management information 51D in the license server 100.

Furthermore, according to a determination request from the periodic process control unit 44 described below, the determining unit 43 determines which client 300 has not undergone data crosscheck for a predetermined time period among the clients 300 entered in the license management information 51D based on the license related information (cache information) 31D received from the application server 200 together with a crosscheck request. The determining unit 43 refers to the license management information 51D via the information management unit 42, and acquires crosscheck record information. The determining unit 43 confirms whether a predetermined time period has passed since the last time a client 300 underwent data crosscheck, based on the date data in the acquired crosscheck record information, period information indicating a predetermined time period set in advance, and the present date. As a result, when it is confirmed that the predetermined time period has passed (when there is a corresponding data item in the license management information 51D), the determining unit 43 identifies the corresponding client 300 by the client identification information associated with the crosscheck record information, and determines the identified client 300 as a client 300 that has not undergone data crosscheck for a predetermined time period.

Meanwhile, when it is confirmed that the predetermined time period has not passed (when there is no corresponding data item in the license management information 51D), the determining unit 43 determines that there is no client 300 that has not undergone data crosscheck for a predetermined time period, among the clients 300 (registered clients) set in the license management information 51D.

The determining unit 43 returns the above determination result to the periodic process control unit 44 that is the requesting source.

The periodic process control unit 44 is a function unit that periodically performs a management process on the license management information 51D. The periodic process control unit 44 implements control so that a management process is periodically executed on the license management information 51D. Examples of the management process are described as follows.

As described above, the periodic process control unit 44 requests the determining unit 43 determine whether a client 300 has not undergone data crosscheck for a predetermined time period, among the clients 300 in the license management information 51D. Based on a determination result returned from the determining unit 43, the periodic process control unit 44 passes the client identification information of the corresponding client 300 to the information management unit 42, and requests the information management unit 42 to update the license management information 51D. Accordingly, for example, data set for a client 300 whose data has not been crosschecked for a predetermined time period is deleted from the license management information 51D (values of client identification item and crosscheck record item are deleted). Thus, the connection license assigned to this client 300 is released according to the crosscheck history of the license related information (cache information) 31D corresponding to the client 300.

As described above, the license management function according to the present embodiment is implemented as the above function units operate in coordination with each other. The license management function according to the present embodiment is implemented as programs (software implementing the license management function) installed in the respective devices configuring the license management system 1 are loaded from storage devices (e.g., HDD, ROM) into memories (e.g., RAM) by processing units (e.g., CPU), and the following processes are executed in the respective devices.

Detailed operations of the license management function according to the present embodiment (coordinated operations of function units) are described with reference to a flowchart indicating processing procedures.

Main Processes of Client Connection

Figure 6:
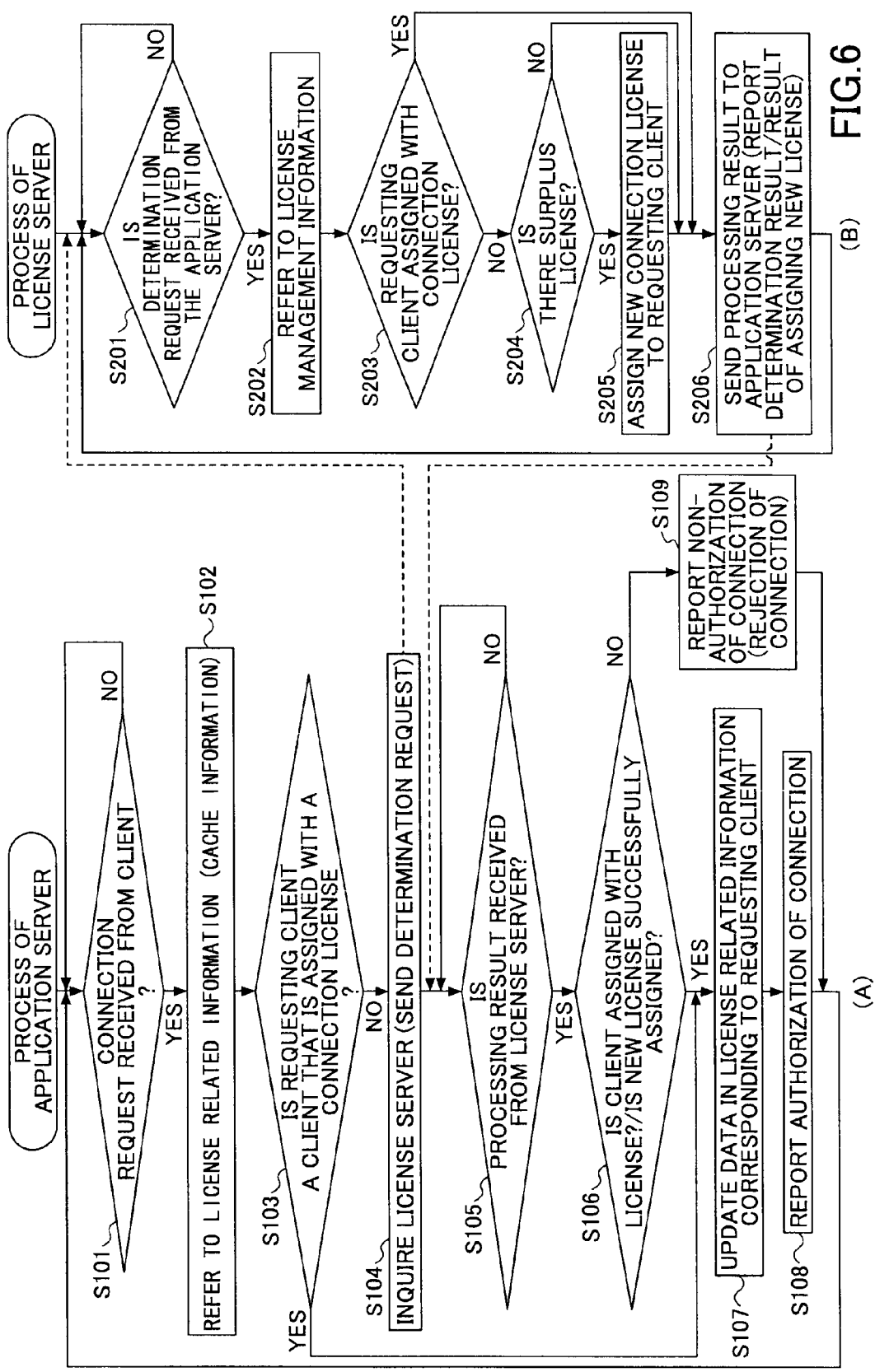
FIG. 6 is a flowchart indicating an example of license management processing procedures performed for client connection according to the first embodiment of the present invention.

FIG. 6 is a flowchart indicating an example of license management processing procedures performed for client connection according to the present embodiment. In FIG. 6, (A) indicates processing procedures of the application server 200 and (B) indicates processing procedures of the license server 100 executed in accordance with the processes of the application server 200.

In FIG. 6(A), when the application server 200 receives a connection request from the client 300 via the communication unit 21 (YES at step S101), the determining unit 23 accesses the license related information storing unit 31 via the information management unit 22 and refers to the license related information (cache information) 31D (step S102).

The determining unit 23 of the application server 200 determines whether the requesting client 300 is a client 300 that is assigned with a connection license (step S103). At this step, the determining unit 23 searches the license related information 31D based on the client identification information of the requesting client 300 received at the time of the connection request, and makes the above determination by confirming whether there is corresponding data.

When the determining unit 23 of the application server 200 determines that the requesting client 300 is a client 300 that is assigned with a connection license (YES at step S103), the information management unit 22 updates the data in the license related information 31D corresponding to the requesting client 300 (step S107). At this step, the determining unit 23 passes the client identification information of the requesting client 300 to the information management unit 22, and requests the information management unit 22 to update the license related information 31D. Accordingly, the information management unit 22 updates the connection record information of the corresponding client identification information in the license related information 31D (updates the connection record information to the present date).

Accordingly, in the application server 200, the cache information of the requesting client 300 that is already assigned with a connection license is updated.

Subsequently, the application server 200 reports authorization of connection to the requesting client 300 via the communication unit 21 (step S108).

Meanwhile, when the determining unit 23 of the application server 200 determines that the requesting client 300 is not a client 300 that is assigned with a connection license (NO at step S103), the determining unit 23 inquires the license server 100 via the communication unit 21 about the assignment status of a connection license with respect to the requesting client 300 (step S104). At this step, the determining unit 23 sends, to the license server 100 via the communication unit 21, a connection license assignment determination request regarding the requesting client 300.

Accordingly, the license server 100 executes a process as illustrated in FIG. 6(B).

When the license server 100 receives a determination request from the application server 200 via the communication unit 41 (YES at step S201), the license server 100 accesses the license management information storing unit 51 via the information management unit 42, and refers to the license management information 51D (step S202).

The determining unit 43 of the license server 100 determines whether the requesting client is assigned with a connection license (step S203). The determining unit 43 searches the license management information 51D based on the client identification information of the requesting client 300 received with the determination request, and makes the above determination by confirming whether there is corresponding data.

When the determining unit 43 of the license server 100 determines that the requesting client 300 is assigned with a connection license (YES at step S203), the determining unit 43 sends, to the application server 200 via the communication unit 41, the processing result of the determining unit 43 (the determination result as to whether a license is assigned) (step S206).

Meanwhile, when the determining unit 43 of the license server 100 determines that the requesting client 300 is not assigned with a connection license (NO at step S203), the determining unit 43 determines whether there is a surplus license among the connection licenses (registered licenses) set in the license management information 51D (step S204). At this step, the determining unit 43 makes the above determination by referring to the license management information 51D and confirming whether there is a connection license that is not assigned to any client 300.

When the determining unit 43 of the license server 100 determines that there is a surplus license among the connection licenses (registered licenses) set in the license management information 51D (YES at step S204), the information management unit 42 updates the license management information 510 corresponding to the surplus license, and assigns a new connection license to the requesting client 300 (step S205). At this step, the determining unit 43 passes the client identification information of the requesting client 300 to the information management unit 42, and requests the information management unit 42 to update the license management information 51D. Accordingly, the information management unit 42 sets the received client identification information in association with the corresponding license identification information in the license management information 51D and updates the license management information 51D.

Subsequently, the license server 100 sends, to the application server 200 via the communication unit 41, the processing result of the information management unit 42 (processing result indicating the successful assignment of the new connection license) (step S206).

When the determining unit 43 of the license server 100 determines that there is no surplus license among the connection licenses (registered licenses) set in the license management information 51D (NO at step S204), the determining unit 43 sends, to the application server 200 via the communication unit 41, the processing result of the information management unit 42 (processing result indicating the unsuccessful assignment of the new connection license) (step S206).

Accordingly, when the application server 200 inquires the license server 100 about the assignment status of a connection license with respect to the requesting client 300, the application server 200 receives one of the above processing results (YES at step S105).

Referring back to FIG. 6(A), the determining unit 23 of the application server 200 determines whether the requesting client 300 is a client 300 that is assigned with a connection license, or whether a new connection license is successfully assigned to the requesting client 300 (step S106). At this step, the determining unit 23 makes the above determination based on the processing result returned from the license server 100.

When the determining unit 23 of the application server 200 determines that the requesting client 300 is a client 300 that is assigned with a connection license, or that a new connection license is successfully assigned to the requesting client 300 (YES at step S106), the information management unit 22 updates the data in the license related information 31D corresponding to the requesting client 300 (step S107). At this step, the determining unit 23 passes the client identification information of the requesting client 300 to the information management unit 22, and requests the information management unit 22 to update the license related information 31D. Accordingly, the information management unit 22 sets the received client identification information and the connection record information (present date) in association with each other in the license related information 31D and updates the license related information 31D.

Accordingly, in the application server 200, the cache information of the requesting client 300 assigned with the new connection license is set/registered. Furthermore, in the application server 200, the cache information of the requesting client 300 that is already assigned with a connection license is reset/registered.

Subsequently, the application server 200 reports authorization of connection to the requesting client 300 via the communication unit 21 (step S108).

Meanwhile, when the determining unit 23 of the application server 200 determines that the requesting client 300 is not a client 300 that is assigned with a connection license, or that a new connection license is not successfully assigned to the requesting client 300 (NO at step S106), the determining unit 23 reports non-authorization of connection (rejection of connection) to the requesting client 300 (step S109).

When the above processes are completed, the process performed by the application server 200 returns to step S101, and the application server 200 waits for a connection request from a client 300 (NO at step S101).

Periodic Process by Application Server

Figure 7:
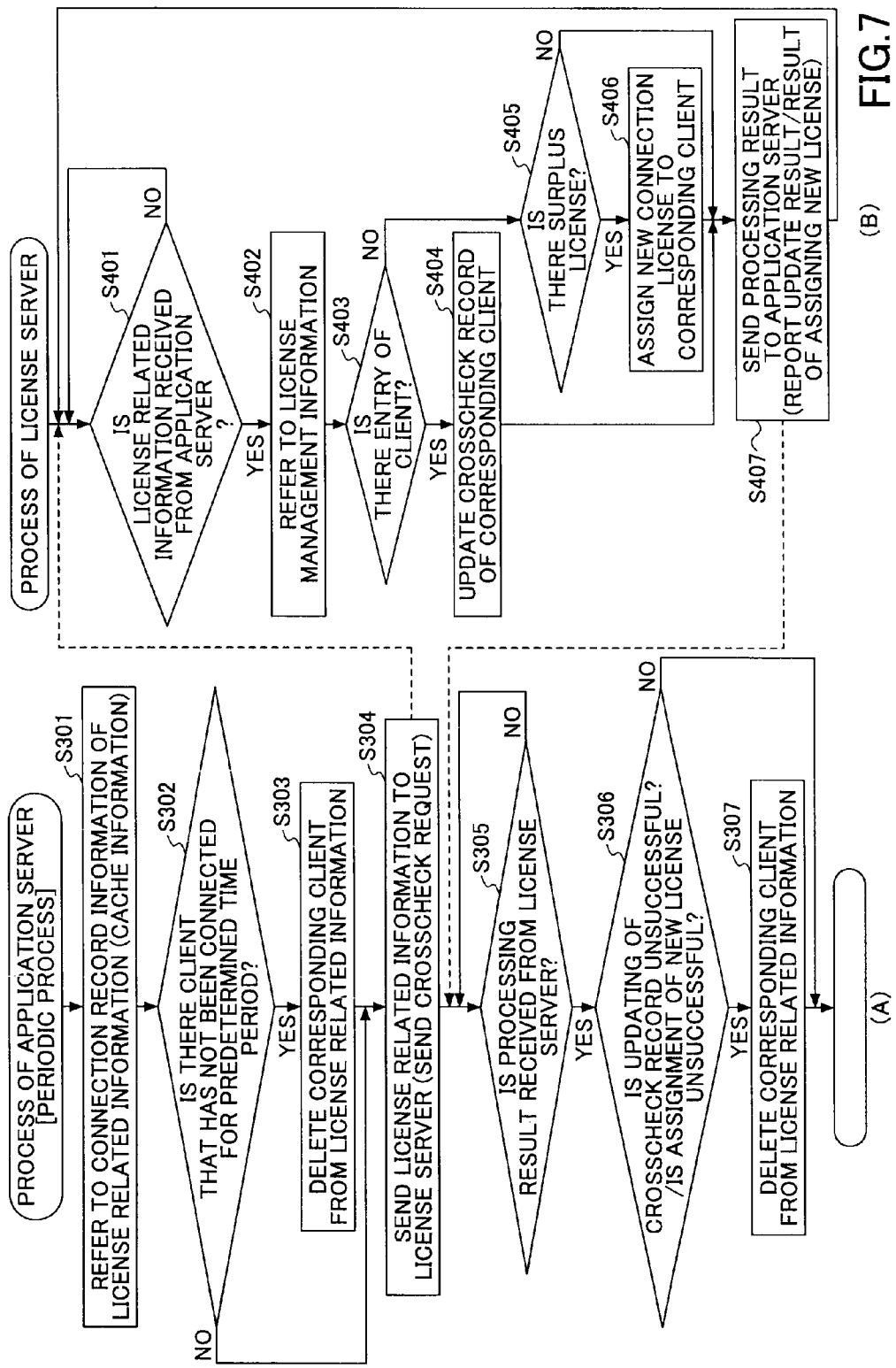
FIG. 7 is a flowchart indicating an example of periodic processing procedures (part 1) performed for license management according to the first embodiment of the present invention.

FIG. 7 is a flowchart indicating an example of periodic processing procedures (part 1) performed for license management according to the present embodiment. In FIG. 7, (A) indicates processing procedures of the application server 200 and (B) indicates processing procedures of the license server 100 executed in accordance with the processes of the application server 200.

In FIG. 7(A), in the application server 200, when a process request is received from the periodic process control unit 24, the information management unit 22 accesses the license related information storing unit 31 and refers to the connection record information of the license related information 31D (step S301).

The determining unit 23 of the application server 200 determines whether there is a client 300 that has not been connected for a predetermined time period, among the clients 300 (registered clients) set in the license related information 31D (step S302). At this step, the determining unit 23 makes the above determination according to a result of confirming whether a predetermined time period has passed since the last connection, based on the date data in the referred connection record information, period information indicating a predetermined time period set in advance, and the present date.

In the application server 200, when the determining unit 23 determines that there is a client 300 that has not been connected for a predetermined time period, among the clients 300 (registered clients) set in the license related information 31D (YES at step S302), the periodic process control unit 24 deletes information of the corresponding client 300 from the license related information 31D via the information management unit 22 (step S303). At this step, the periodic process control unit 24 passes the client identification information of the corresponding client 300 to the information management unit 22, and requests the information management unit 22 to delete the corresponding information from the license related information 31D. Accordingly, the information management unit 22 deletes the corresponding client identification information and connection record information from the license related information 31D.

Accordingly, in the application server 200, the cache information of a registered client 300 that has not been connected for a predetermined time period is deleted.

Meanwhile, when the determining unit 23 determines that there is no client 300 that has not been connected for a predetermined time period, among the clients 300 (registered clients) set in the license related information 31D (NO at step S302), the periodic process control unit 24 does not perform the deleting process of step S303.

The determining step of step S302 is performed for each client 300 (registered client) set in the license related information 31D.

Subsequently, the periodic process control unit 24 of the application server 200 sends the license related information 31D to the license server 100 via the communication unit 21 (step S304). At this step, the periodic process control unit 24 also sends a crosscheck request for the latest license related information 31D to the license server 100 via the communication unit 21.

Accordingly, in the license server 100, a process as illustrated in FIG. 7(B) is executed.

When the license server 100 receives the license related information 31D from the application server 200 via the communication unit 41 (YES at step S401), the determining unit 43 accesses the license management information storing unit 51 via the information management unit 42 and refers to the license management information 51D (step S402).

The determining unit 43 of the license server 100 determines whether the client 300 (registered client) set in the received license related information 31D is entered (registered) in the license management information 51D (step S403). At this step, the determining unit 43 makes the above determination by searching the license management information 51D based on the client identification information in the license related information 31D received with the crosscheck request, and confirming whether there is corresponding data.

When the determining unit 43 of the license server 100 determines that the client 300 (registered client) set in the received license related information 31D is entered (registered) in the license management information 51D (YES at step S403), the information management unit 42 updates the data of the corresponding client 300 in the license management information 51D (step S404). At this step, the determining unit 43 passes, to the information management unit 42, the client identification information of the corresponding client 300 set in the license related information 31D, and requests the information management unit 42 to update the license management information 51D. Accordingly, the information management unit 42 updates the crosscheck record information of the corresponding client identification information in the license management information 51D (updates the connection record information to the present date).

Subsequently, the license server 100 sends a processing result of the information management unit 42 (processing result of updating crosscheck record) to the application server 200 via the communication unit 41 (step S407).

Meanwhile, when the determining unit 43 of the license server 100 determines that the client 300 (registered client) set in the received license related information 31D is not entered (registered) in the license management information 51D (NO at step S403), the determining unit 43 determines whether there is a surplus license among the connection licenses (registered licenses) set in the license management information 51D (step S405). At this step, the determining unit 43 makes the above determination by referring to the license management information 51D and confirming whether there is a connection license that is not assigned to any client 300.

When the determining unit 43 of the license server 100 determines that there is a surplus license among the connection licenses (registered licenses) set in the license management information 51D (YES at step S405), the information management unit 42 updates the data corresponding to the surplus license in the license management information 51D, and assigns a new connection license to the corresponding client 300 (step S406). At this step, the determining unit 43 passes the client identification information of the requesting client to the information management unit 42, and requests the information management unit 42 to update the license management information 51D. Accordingly, the information management unit 42 sets the received client identification information in association with the corresponding license identification information in the license management information 51D and updates the license management information 51D. At this time, the information management unit 42 also sets the crosscheck record information (present date) in association with the client identification information.

Subsequently, the license server 100 sends a processing result of the information management unit 42 (indicating that the new connection license is successfully assigned) to the application server 200 via the communication unit 41 (step S407).

Meanwhile, when the determining unit 43 determines that there is no surplus license among the connection licenses (registered licenses) set in the license management information 51D (NO at step S405), the license server 100 sends a processing result of the information management unit 42 (indicating that the new license is not successfully assigned) to the application server 200 via the communication unit 41 (step S407).

Accordingly, when the latest license related information 31D is sent to the license server 100, the application server 200 receives one of the above processing results (YES at step S305).

Referring back to FIG. 7(A), subsequently, the determining unit 23 of the application server 200 determines whether the operation of updating the crosscheck record has been unsuccessful or whether the operation of assigning a new connection license has been unsuccessful (step S306). At this step, the determining unit 23 makes the above determination based on the processing result returned from the license server 100.

When the determining unit 23 of the application server 200 determines that the operation of updating the crosscheck record has been unsuccessful or the operation of assigning a new connection license has been unsuccessful (YES at step S306), the periodic process control unit 24 deletes the information relevant to the corresponding client 300 from the license related information 31D, via the information management unit 22 (step S307). At this step, the periodic process control unit 24 passes the client identification information of the corresponding client 300 to the information management unit 22, and requests the information management unit 22 to delete the information. Accordingly, the information management unit 22 deletes the client identification information and the connection record information from the license related information 31D.

Accordingly, in the application server 200, the cache information of the registered client 300 for which the operation of updating the crosscheck record has been unsuccessful, is deleted. Furthermore, in the application server 200, the cache information of the registered client 300 for which the operation of assigning a new connection license has been unsuccessful, is deleted.

Meanwhile, when the determining unit 23 of the application server 200 determines that the operation of updating the crosscheck record has been successful or the operation of assigning a new connection license has been successful (NO at step S306), the periodic process control unit 24 does not perform the deleting process of step S307.

By periodically performing the above process, the application server 200 matches the license related information 31D with the license management information 51D included in the license server 100. The periodic process of FIG. 7(A) is executed when the application server 200 is holding the license related information 31D in which the client 300 is set.

Periodic Process by License Server

Figure 8:
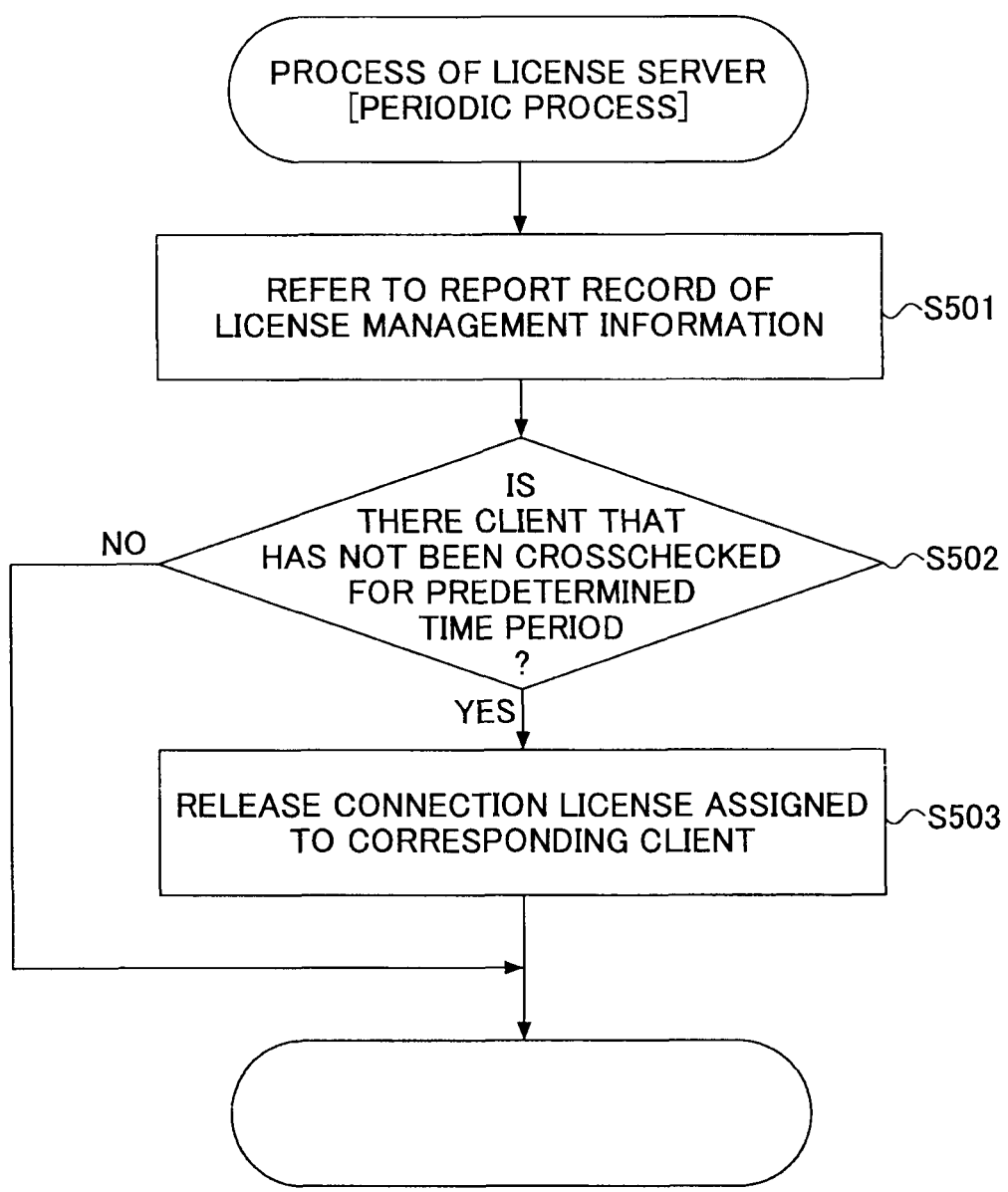
FIG. 8 is a flowchart indicating an example of periodic processing procedures (part 2) performed for license management according to the first embodiment of the present invention.

FIG. 8 is a flowchart indicating an example of periodic processing procedures (part 2) performed for license management according to the present embodiment. FIG. 8 indicates periodic processing procedures executed by the license server 100 alone.

As shown in FIG. 8, in the license server 100, in response to a processing request from the periodic process control unit 44, the information management unit 42 accesses the license management information storing unit 51, and refers to the crosscheck record information in the license management information 51D (step S501).

The determining unit 43 of the license server 100 determines whether there is a client 300 whose data has not been crosschecked for a predetermined time period, among the clients 300 (registered clients) set in the license management information 51D, based on the license related information 31D received together with the crosscheck request from the application server 200 (step S502). At this step, the determining unit 43 makes the above determination according to a result of confirming whether a predetermined time period has passed since the last crosscheck, based on the date data in the referred connection record information, period information indicating a predetermined time period set in advance, and the present date.

In the license server 100, when the determining unit 43 determines that there is a client 300 whose data has not been crosschecked for a predetermined time period, among the clients 300 (registered clients) set in the license management information 51D (YES at step S502), the periodic process control unit 44 deletes data of the corresponding client 300 from the license management information 51D via the information management unit 42, so that the connection license assigned to the corresponding client 300 is released (step S503). At this step, the periodic process control unit 44 passes the client identification information of the corresponding client 300 to the information management unit 42, and requests the information management unit 42 to delete the corresponding data from the license management information 51D. Accordingly, the information management unit 42 deletes the received client identification information and crosscheck record information that are set in association with the corresponding license identification information in the license management information 51D.

Accordingly, in the license server 100, a connection license assigned to a registered client 300 whose data has not been crosschecked for a predetermined time period is released. More specifically, the connection license is released when the data of the client 300 in the license management information 51D included in the license server 100 and the corresponding data of the client 300 in the license related information (cache information) 31D included in the application server 200 have not been crosschecked for a predetermined time period.

Meanwhile, when the determining unit 43 of the license server 100 determines that there is no client 300 whose data has not been crosschecked for a predetermined time period, among the clients 300 (registered clients) set in the license management information 51D (NO at step S502), the periodic process control unit 44 does not perform the deleting process of step S503.

The determining step of step S502 is performed for each client 300 (registered client) set in the license management information 51D.

The following describes six examples of operations of the license management system 1 according to the present embodiment, which are implemented by the above processing procedures.

Operation Example 1

Figure 9:
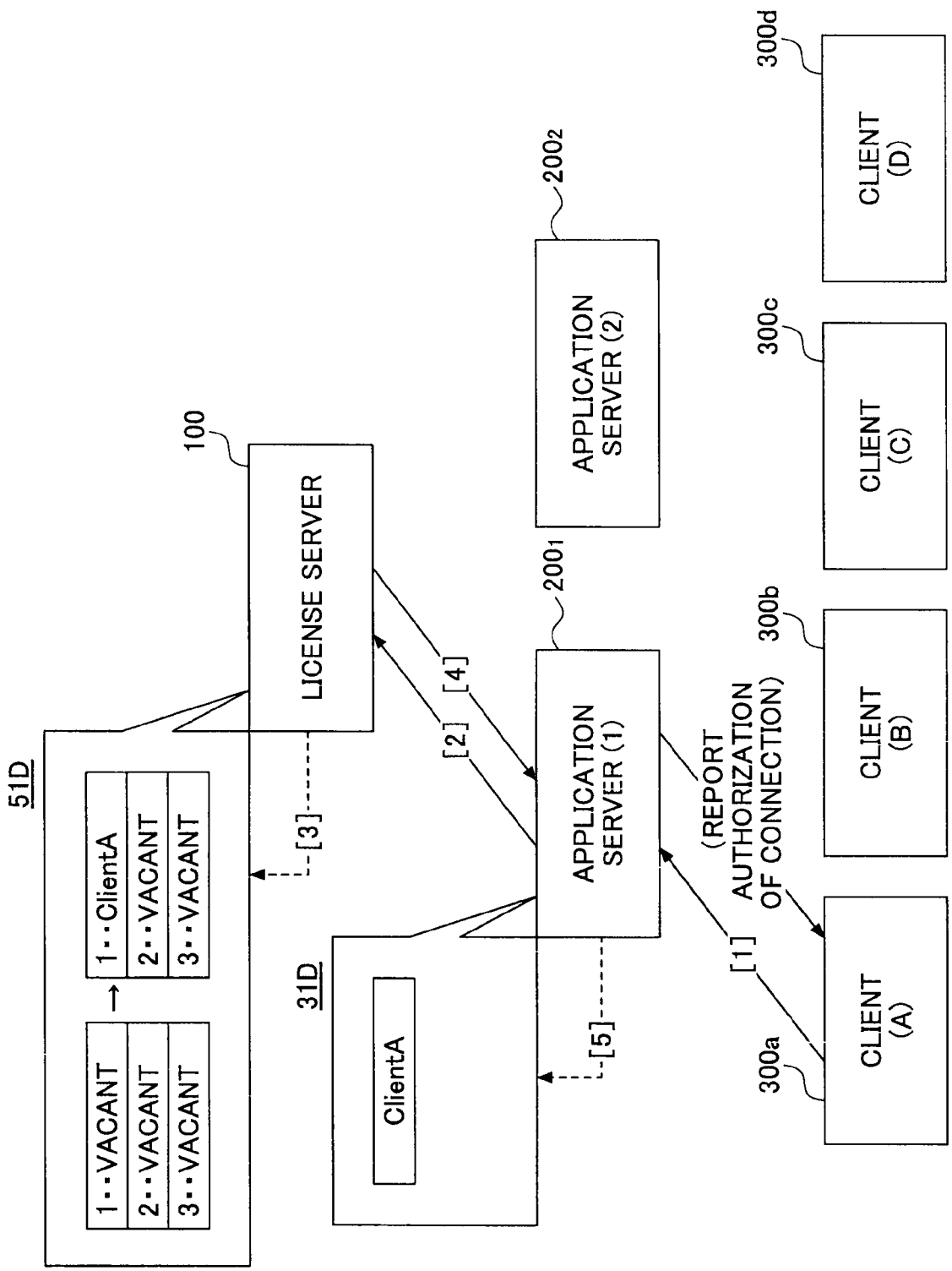
FIG. 9 indicates an operation example 1 of license management according to the first embodiment of the present invention.

FIG. 9 indicates an operation example 1 of license management according to the present embodiment. FIG. 9 illustrates an operation example in which a client (A) 300a that is not assigned with a connection license makes a connection request to an application server (1) $200_1$.

As shown in FIG. 9, when the client (A) 300a makes a connection request to the application server (1) $200_1$ [1], the application server (1) $200_1$ refers to the license related information 31D and confirms that the client (A) 300a is not registered. Next, the application server (1) $200_1$ requests the license server 100 to make a connection license assignment determination [2].

The license server 100 refers to the license management information 51D and confirms that a connection license is not assigned to the client (A) 300a. Next, the license server 100 confirms whether there is a surplus license based on the license management information 51D, newly assigns the surplus connection license to the client (A) 300a, and updates the license management information 51D [3].

Subsequently, when a processing result (indicating that the new connection license is successfully assigned) is returned from the license server 100 [4], the application server (1) $200_1$ registers the client (A) 300a to which the new connection license has been assigned in the license related information 31D, and updates the license related information 31D [5].

Accordingly, connection authorization is reported from the application server (1) $200_1$ to the client (A) 300a.

As described above, connection of a new client 300 is authorized in the license management system 1 according to the present embodiment.

Operation Example 2

Figure 10:
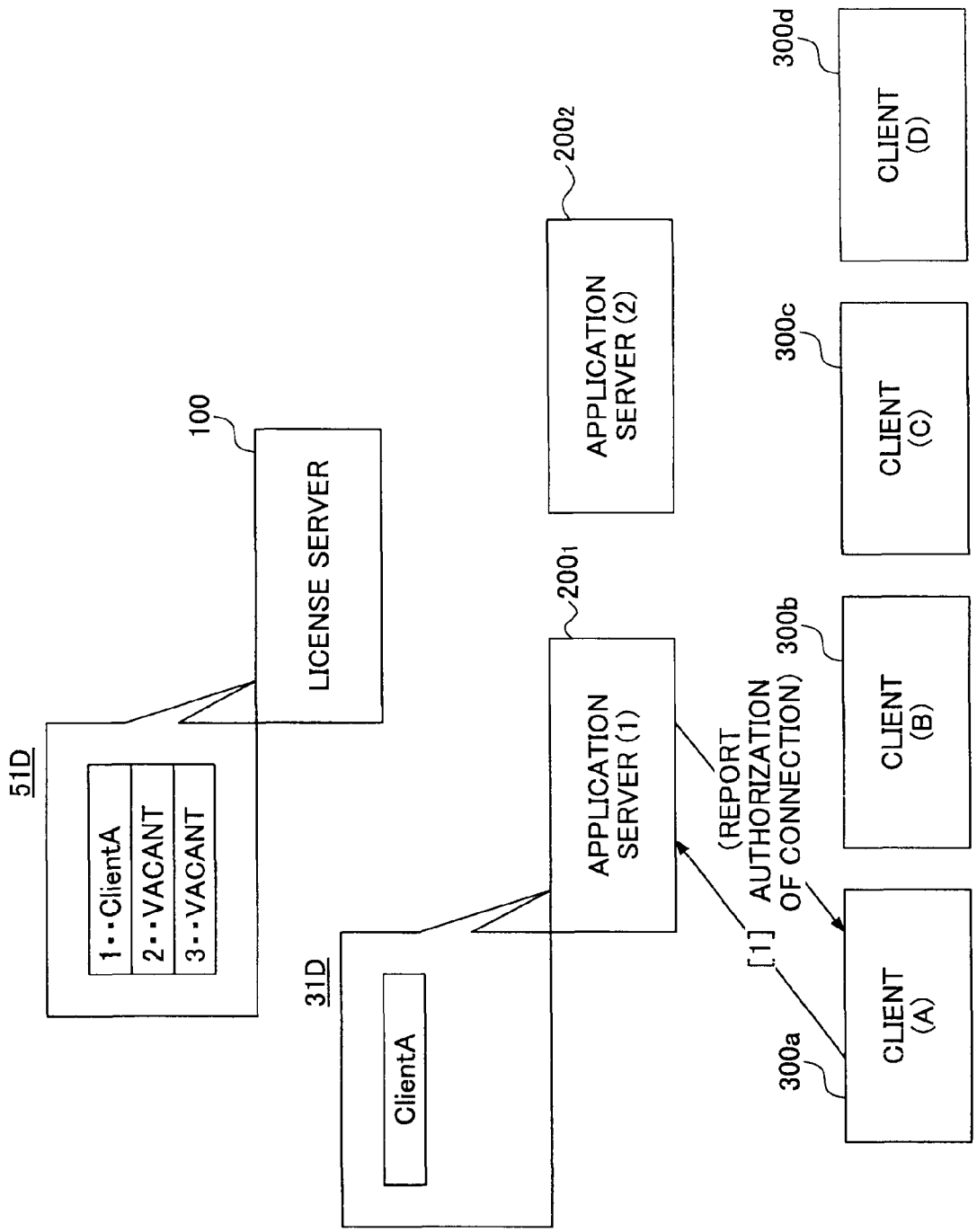
FIG. 10 indicates an operation example 2 of license management according to the first embodiment of the present invention.

FIG. 10 indicates an operation example 2 of license management according to the present embodiment. FIG. 10 illustrates an operation example in which the connection license of a client (A) 300a is managed in the license server 100, and the client (A) 300a assigned with the connection license makes a connection request to the application server (1) $200_1$.

As shown in FIG. 10, when the client (A) 300a makes a connection request to the application server (1) $200_1$ [1], the application server (1) $200_1$ refers to the license related information 31D and confirms that the client (A) 300a is registered.

Accordingly, connection authorization is reported from the application server (1) $200_1$ to the client (A) 300a.

As described above, connection of a registered client 300 is authorized in the license management system 1 according to the present embodiment. Furthermore, in the license management system 1, the client (A) 300a is already registered (cached) in the application server (1) $200_1$, and therefore a connection license assignment determination request is not made to the license server 100. Accordingly, in the license management system 1, the processing time required for connection can be reduced.

Operation Example 3

Figure 11:
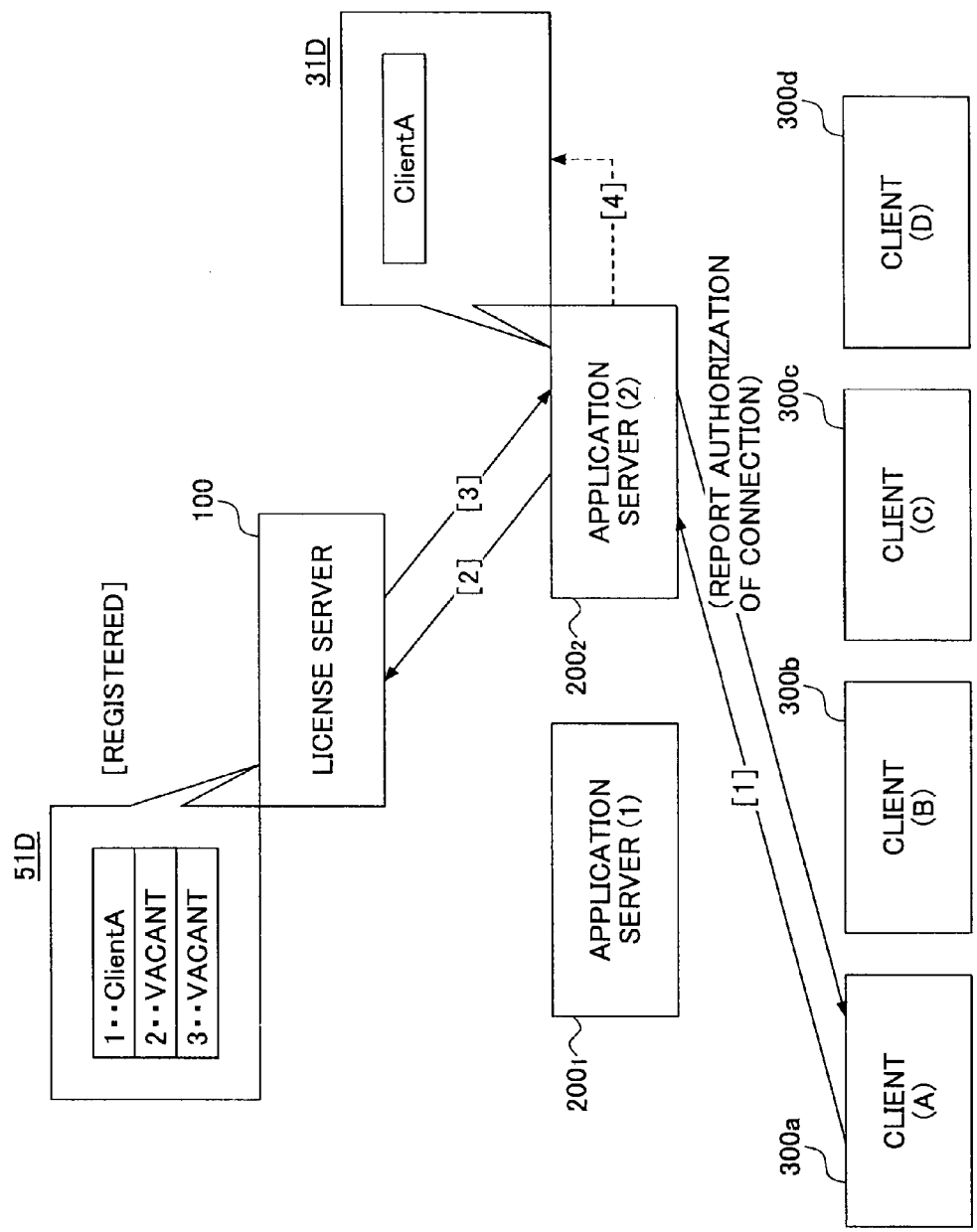
FIG. 11 indicates an operation example 3 of license management according to the first embodiment of the present invention.

FIG. 11 indicates an operation example 3 of license management according to the present embodiment. FIG. 11 illustrates an operation example in which the connection license of a client (A) 300*a* is managed in the license server 100, and the client (A) 300*a* assigned with the connection license makes a connection request to the application server (2) 200$_2$.

As shown in FIG. 11, when the client (A) 300*a* makes a connection request to the application server (2) 200$_2$ [1], the application server (2) 200$_2$ refers to the license related information 31D and confirms that the client (A) 300*a* is not registered. Next, the application server (2) 200$_2$ requests the license server 100 to make a connection license assignment determination [2].

The license server 100 refers to the license management information 51D and confirms that a connection license is assigned to the client (A) 300*a*.

Subsequently, when a processing result (indicating that a connection license is assigned) is returned from the license server 100 [3], the application server (2) 200$_2$ registers, in the license related information 31D, the client (A) 300*a* to which the connection license is already assigned, and updates the license related information 31D [4].

Accordingly, connection authorization is reported from the application server (2) 200$_2$ to the client (A) 300*a*.

As described above, even if the connection destination of the client 300 is changed (the application server 200 to which connection is to be made is changed), connection of the requesting client 300 is authorized according to a single connection license.

Operation Example 4

Figure 12:
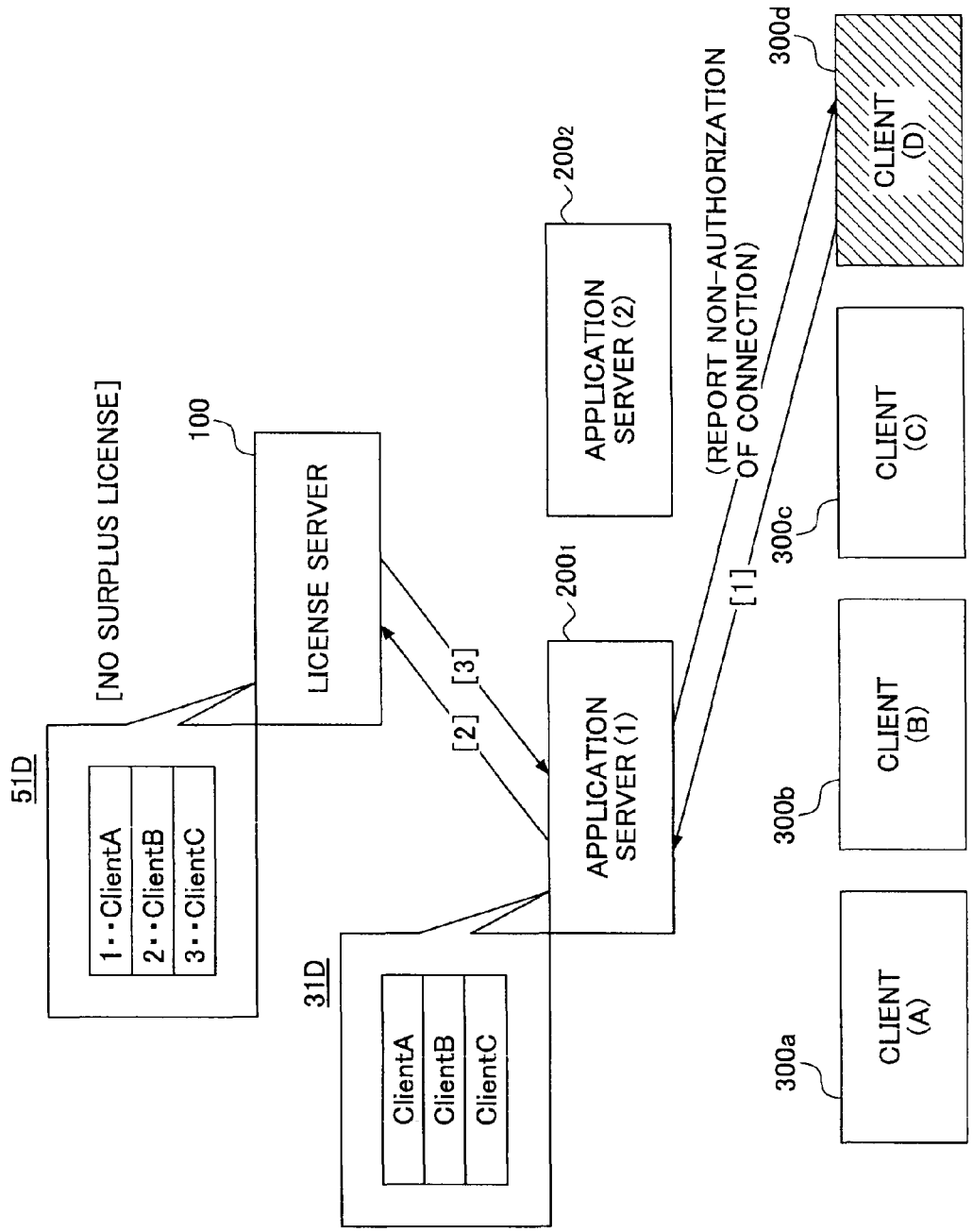
FIG. 12 indicates an operation example 4 of license management according to the first embodiment of the present invention.

FIG. 12 indicates an operation example 4 of license management according to the present embodiment. FIG. 12 illustrates an operation example in which the connection licenses of a client (A) 300*a*, a client (B) 300*b*, and a client (C) 300*c* are managed in the license server 100, and there are no surplus licenses, and a client (D) 300*d* that is not assigned with a connection license makes a connection request to the application server (1) 200$_1$.

As shown in FIG. 12, when the client (D) 300*d* makes a connection request to the application server (1) 200$_1$ [1], the application server (1) 200$_1$ refers to the license related information 31D and confirms that the client (D) 300*d* is not registered. Next, the application server (1) 200$_1$ requests the license server 100 to make a connection license assignment determination [2].

The license server 100 refers to the license management information 51D and confirms that a connection license is not assigned to the client (D) 300*d*. Next, the license server 100 confirms whether there is a surplus license based on the license management information 51D, and confirms that that there is no surplus license that can be assigned to the client (D) 300*d*.

Subsequently, when a processing result (indicating that the new connection license is not successfully assigned) is returned from the license server 100 [3], the application server (1) 200$_1$ reports that connection is not authorized to the client (D) 300*d*.

As described above, in the license management system 1 according to the present embodiment, when there are no surplus licenses available for connecting a new client 300, connection of the new client 300 is not authorized (connection is rejected).

Operation Example 5

Figure 13:
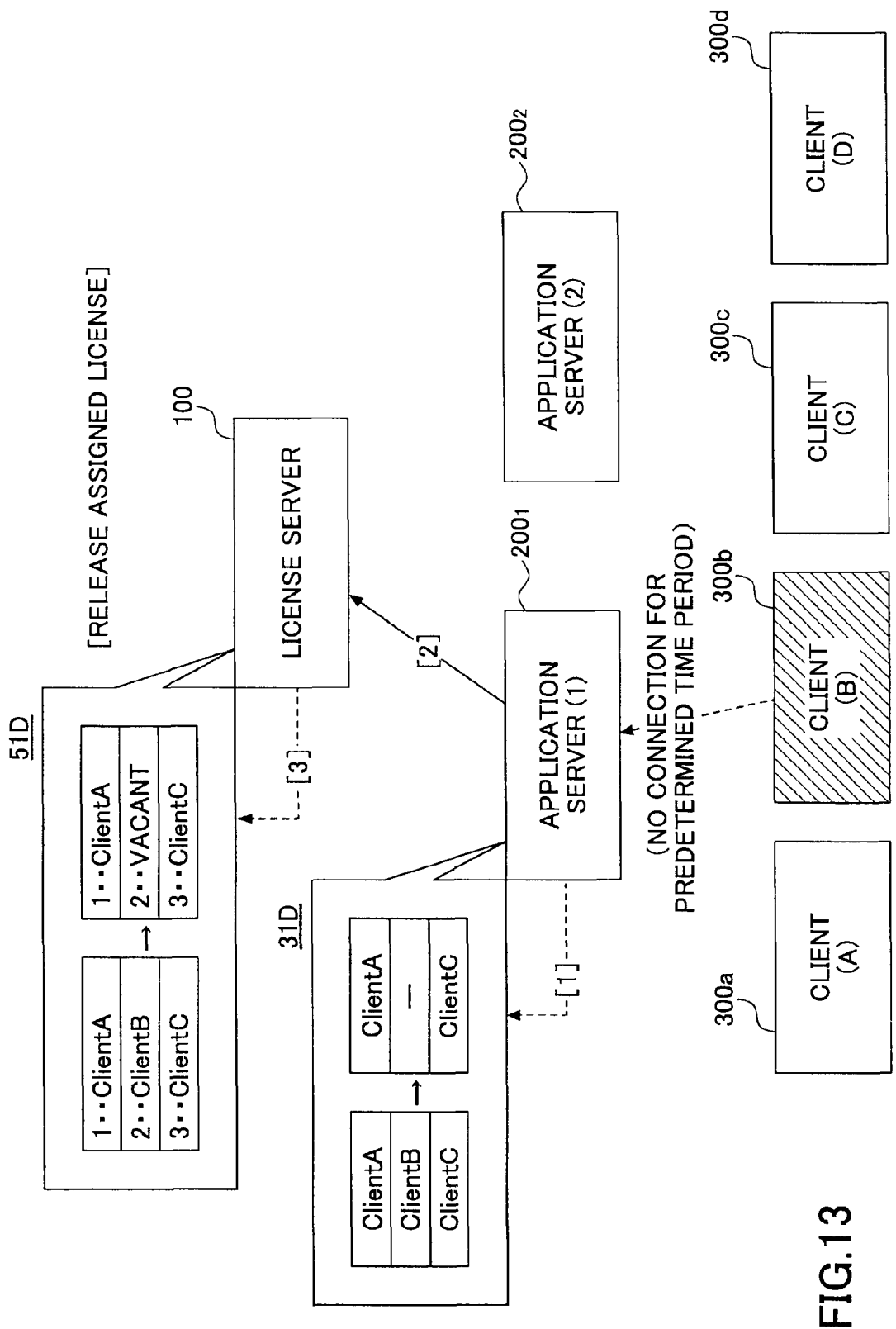
FIG. 13 indicates an operation example 5 of license management according to the first embodiment of the present invention.

FIG. 13 indicates an operation example 5 of license management according to the present embodiment. FIG. 13 illustrates an operation example in which a periodic process is performed when a client (B) 300*b* registered in an application server (1) 200$_1$ has not been connected for a predetermined time period.

As shown in FIG. 13, in a periodic process, the application server (1) 200$_1$ refers to the license related information 31D and confirms that the client (B) 300*b* has not been connected for a predetermined time period. The application server (1) 200$_1$ deletes the data corresponding to the client (B) 300*b* from the license related information 31D based on the confirmation result (indicating that there is no connection for a predetermined time period), and updates the license related information 310 [1]. Subsequently, the application server (1) 200$_1$ sends the updated license related information 31D to the license server 100 and requests the license server 100 to perform data crosscheck [2].

Accordingly, the license server 100 refers to the license management information 51D and updates the crosscheck record information of the clients 300 set in the license related information 31D (the clients 300 other than the client (B) 300*b*).

Subsequently, in a periodic process, the license server 100 refers to the license management information 51D, and confirms that the data of the client (B) 300*b* has not been crosschecked for a predetermined time period, based on the crosscheck record information. Based on the confirmation result (indicating that there is no crosschecking for a predetermined time period), the license server 100 deletes the data corresponding to the client (B) 300*b* from the license management information 51D, and updates the license management information 51D [3].

As described above, in the license management system 1 according to the present embodiment, a connection license assigned to a registered client 300 whose data has not been crosschecked for a predetermined time period is released (becomes a surplus license). More specifically, the connection license is released when the data of the client 300 in the license management information 51D included in the license server 100 and the corresponding data of the client 300 in the license related information (cache information) 31D included in the application server 200 have not been crosschecked for a predetermined time period.

Operation Example 6

Figure 14:
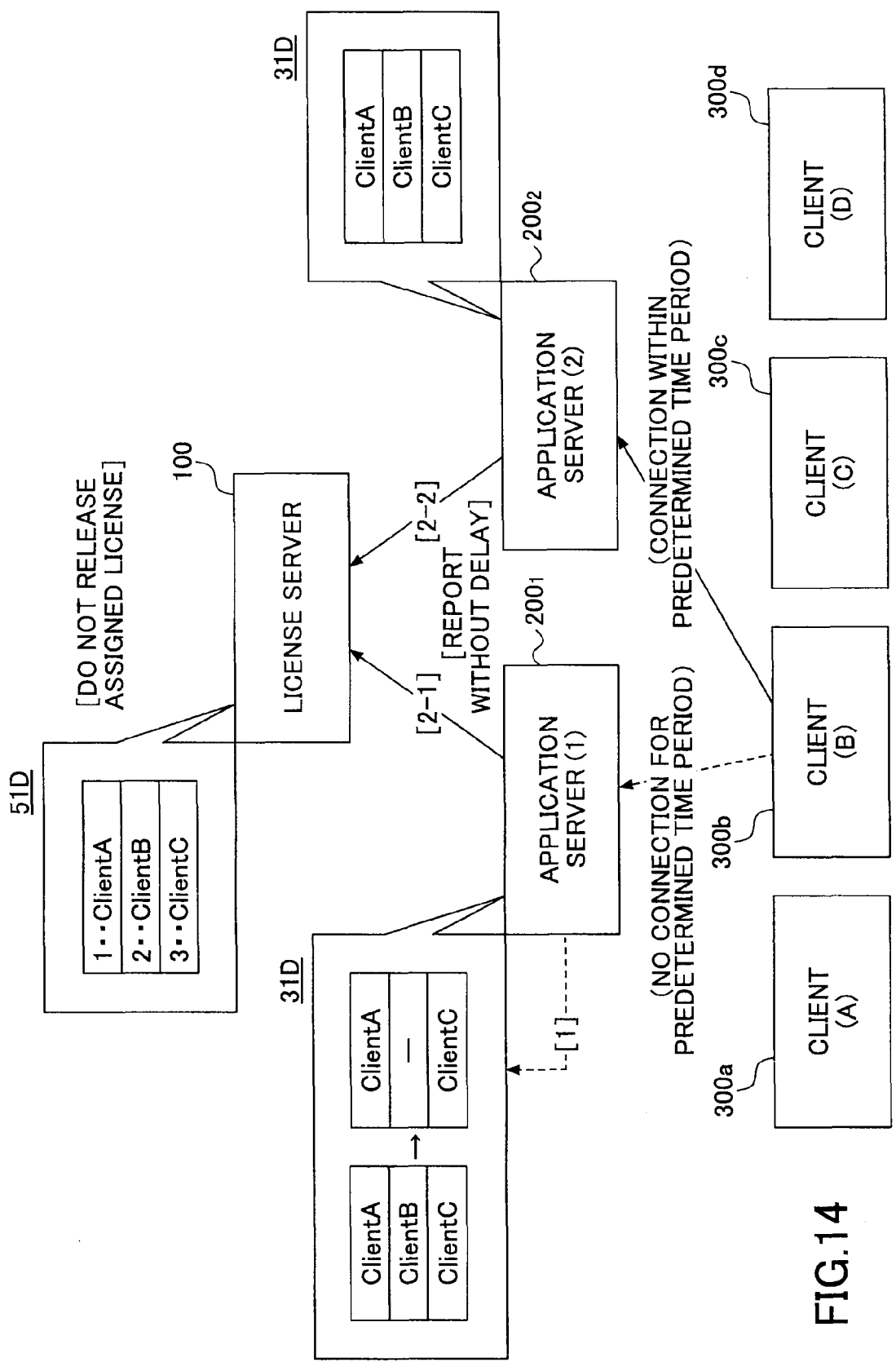
FIG. 14 indicates an operation example 6 of license management according to the first embodiment of the present invention.

FIG. 14 indicates an operation example 6 of license management according to the present embodiment. FIG. 14 illustrates an operation example in which an application server (1) 200$_1$ and an application server (2) 200$_2$ performs periodic processes when a client (B) 300*b*, which is registered in the application server (1) 200$_1$ and the application server (2) 200$_2$, is not connected to the application server (1) 200$_1$ for a predetermined time period.

As shown in FIG. 14, in the periodic process, the application server (1) 200$_1$ refers to the license related information 31D and confirms that the client (B) 300*b* has not been connected for a predetermined time period, based on the connection record information. Based on the confirmation result (indicating that there is no connection for a predetermined time period), the application server (1) $200_1$ deletes the data corresponding to the client (B) 300b from the license related information 31D, and updates the license related information 31D [1]. Subsequently, the application server (1) $200_1$ sends the updated license related information 31D to the license server 100, and requests the license server 100 to perform data crosscheck [2-1].

Accordingly, the license server 100 refers to the license management information 51D, and updates the crosscheck record information of the clients 300 set in the license related information 31D (the clients 300 other than the client (B) 300b).

Meanwhile, in the periodic process, the application server (2) $200_2$ refers to the license related information 31D, and confirms that the client (B) 300b is connected, based on the connection record information. Accordingly, in the application server (2) $200_2$, the data corresponding to the client (B) 300b is not deleted from the license related information 31D. Subsequently, the application server (2) $200_2$ sends the license related information 31D to the license server 100 without delay, and requests the license server 100 to perform data crosscheck [2-2].

Accordingly, the license server 100 refers to the license management information 51D, and updates the crosscheck record information of the clients 300 set in the license related information 31D (all registered clients 300 including the client (B) 300b).

Accordingly, at the license server 100, a connection license assigned to the client (B) 300b is not released, even if the client (B) 300b has not been connected to the application server (1) $200_1$ for a predetermined time period.

As described above, a connection license is kept to be assigned to a client 300, even if the client 300 has not been connected for a predetermined time period to a certain application server 200 among plural application servers 200, as long as a crosscheck request is reported without delay to the license server 100 from another application server 200 to which the client 300 is connected.

Overview of First Embodiment

As described above, the license management system 1 according to the present embodiment executes inter-server cooperative processing as summarized below.

First, in the application server 200 that has received a connection request from the client 300, the determining unit 23 refers to the license related information (cache information) 31D via the information management unit 22, and determines whether the requesting client 300 is a client 300 that is assigned with a connection license. When the requesting client 300 is not a client 300 that is assigned with a connection license, the application server 200 requests the license server 100 via the communication unit 21 to perform connection license assignment determination.

Accordingly, in response to the determination request, the determining unit 43 of the license server 100 refers to the license management information 51D via the information management unit 42, and determines whether a connection license is assigned to the requesting client 300. The license server 100 returns the determination result to the application server 200 via the communication unit 41.

Accordingly, the application server 200 controls the operation of authorizing connection of the requesting client 300 based on the determination result.

Furthermore, in the license management system 1 according to the present embodiment, a matching process is periodically performed on the license related information 31D included in the application server 200 and the license management information 51D included in the license server 100.

Accordingly, in the license management system 1 according to the present embodiment, the process of managing connection licenses assigned to clients 300 is executed in a cooperative manner by the application server 200 and the license server 100 (inter-server cooperation). Accordingly, in the present embodiment, the client 300 can use functions provided by plural servers 200 with a single connection license.

Second Embodiment

In a second embodiment, a description is given of a system configuration in which the license management information is updated according to failures of the application server and communication failures between servers, and in which connection licenses are collectively managed.

Operation Example 1

Figure 15:
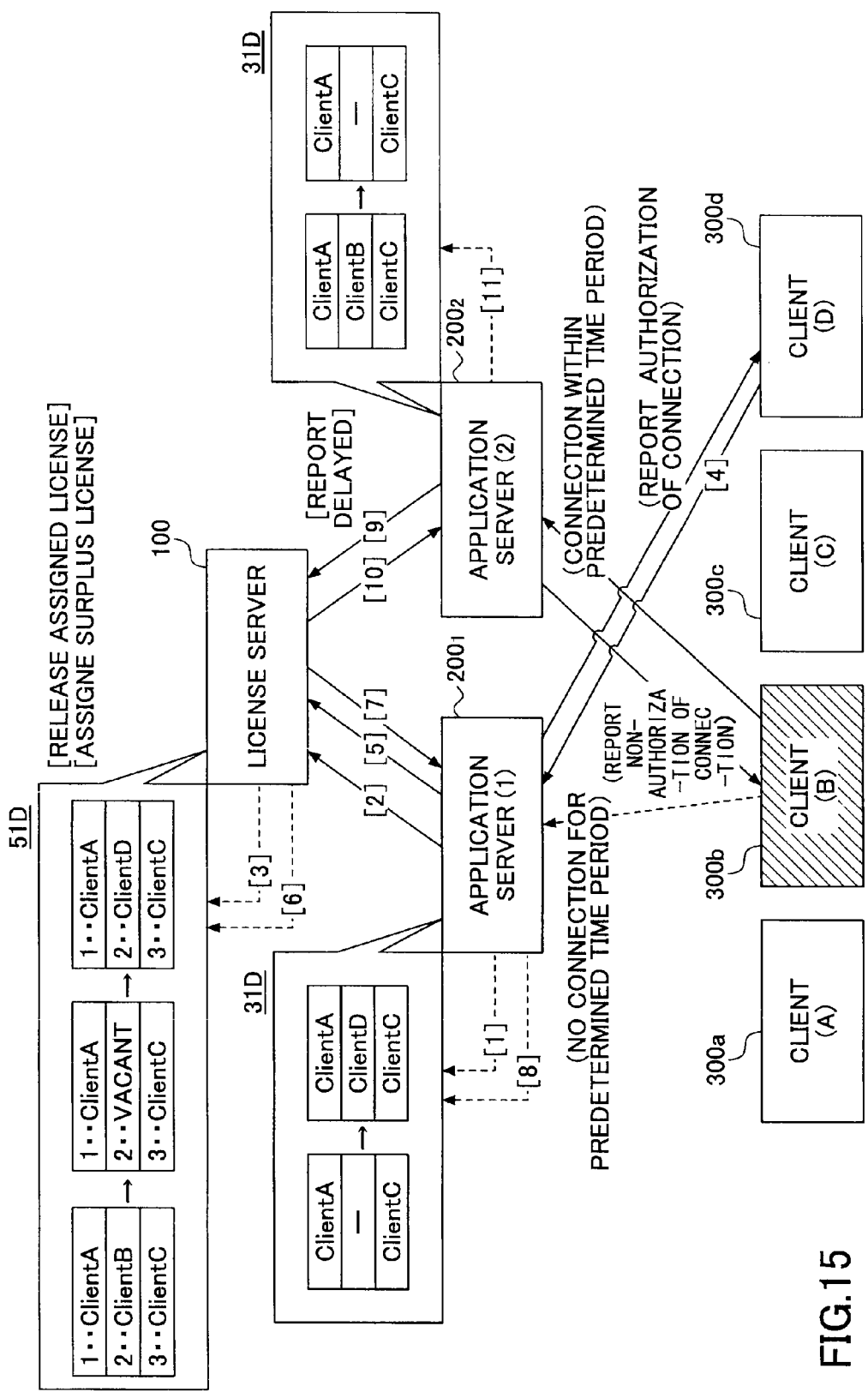
FIG. 15 indicates an operation example of license management in which a communication failure occurs between servers.

FIG. 15 indicates an operation example of license management in which a communication failure occurs between servers. FIG. 15 indicates an operation example in which the following occurs in the operation example 6 indicated in FIG. 14. Specifically, a client (D) 300d that is not assigned with a connection license makes a connection request to the application server (1) $200_1$, in a case where a crosscheck request is reported with delay from the application server (2) $200_2$ to the license server 100 due to a communication failure between servers.

As shown in FIG. 15, in the periodic process, the application server (1) $200_1$ refers to the license related information 31D and confirms that the client (B) 300b has not been connected for a predetermined time period, based on the connection record information. The application server (1) $200_1$ deletes the data corresponding to the client (B) 300b from the license related information 31D based on the confirmation result (indicating that there is no connection for a predetermined time period), and updates the license related information 31D [1]. Subsequently, the application server (1) $200_1$ sends the updated license related information 31D to the license server 100, and requests the license server 100 to perform data crosscheck [2].

Accordingly, the license server 100 refers to the license management information 51D, and updates the crosscheck record information of the clients 300 set in the license related information 31D (the clients 300 other than the client (B) 300b).

Meanwhile, in the periodic process, the application server (2) $200_2$ refers to the license related information 31D and confirms that the client (B) 300b is connected, based on the connection record information. Accordingly, in the application server (2) $200_2$, the data corresponding to the client (B) 300b is not deleted from the license related information 31D.

However, for some reason, the crosscheck request from the application server (2) $200_2$ to the license server 100 is delayed (the license related information 31D is not sent).

During this time, a periodic process is performed at the license server 100. In the periodic process, the license server 100 refers to the license management information 51D and confirms that the data of the client (B) 300b has not been crosschecked for a predetermined time period, based on the crosscheck record information. The license server 100 deletes the data corresponding to the client (B) 300b from the license management information 51D based on the confirmation result (indicating that there is no crosschecking for a predetermined time period), and updates the license management information 51D [3]. That is to say, at the license server 100, the connection license assigned to the client (B) 300*b* is released (becomes a surplus license).

During this time, when the client (D) 300*d* makes a connection request to the application server (1) $200_1$ [4], the application server (1) $200_1$ refers to the license related information 31D and confirms that the client (D) 300*d* is not registered. Next, the application server (1) $200_1$ requests the license server 100 to make a connection license assignment determination [5].

The license server 100 refers to the license management information 51D and confirms that a connection license is not assigned to the client (D) 300*d*. Next, the license server 100 confirms whether there is a surplus license based on the license management information 51D, assigns the released connection license (surplus license) to the client (D) 300*d*, and updates the license management information 51D [6].

Subsequently, when a processing result (indicating that the new connection license is successfully assigned) is returned from the license server 100 [7], the application server (1) $200_1$ registers, in the license related information 31D, the client (D) 300*d* to which the new connection license has been assigned, and updates the license related information 31D [8].

Accordingly, connection authorization is reported from the application server (1) $200_1$ to the client (D) 300*d*.

Meanwhile, in the application server (2) $200_2$, when the cause of the delay (communication failure) is solved and a crosscheck request is reported (license related information 31D is sent) to the license server 100 [9], the license server 100 refers to the license management information 51D and updates the crosscheck record information of the clients 300 set in the license related information 31D (all registered clients 300 including the client (B) 300*b*). However, the license server 100 fails to update the crosscheck record information corresponding to the client (B) 300*b*.

Accordingly, when the processing result (indicating that the updating of the crosscheck record is unsuccessful) is returned from the license server 100 [10], the application server (2) $200_2$ deletes the data corresponding to the client (B) 300*b* from the license related information 31D based on the processing result, and updates the license related information 31D [11].

Accordingly, the application server (2) $200_2$ reports non-authorization of connection to the client (B) 300*b*.

Factors causing a delay in reporting a request for data crosscheck may include a breakdown of hardware/software of the application server 200, other than communication failures between servers.

Figure 16:
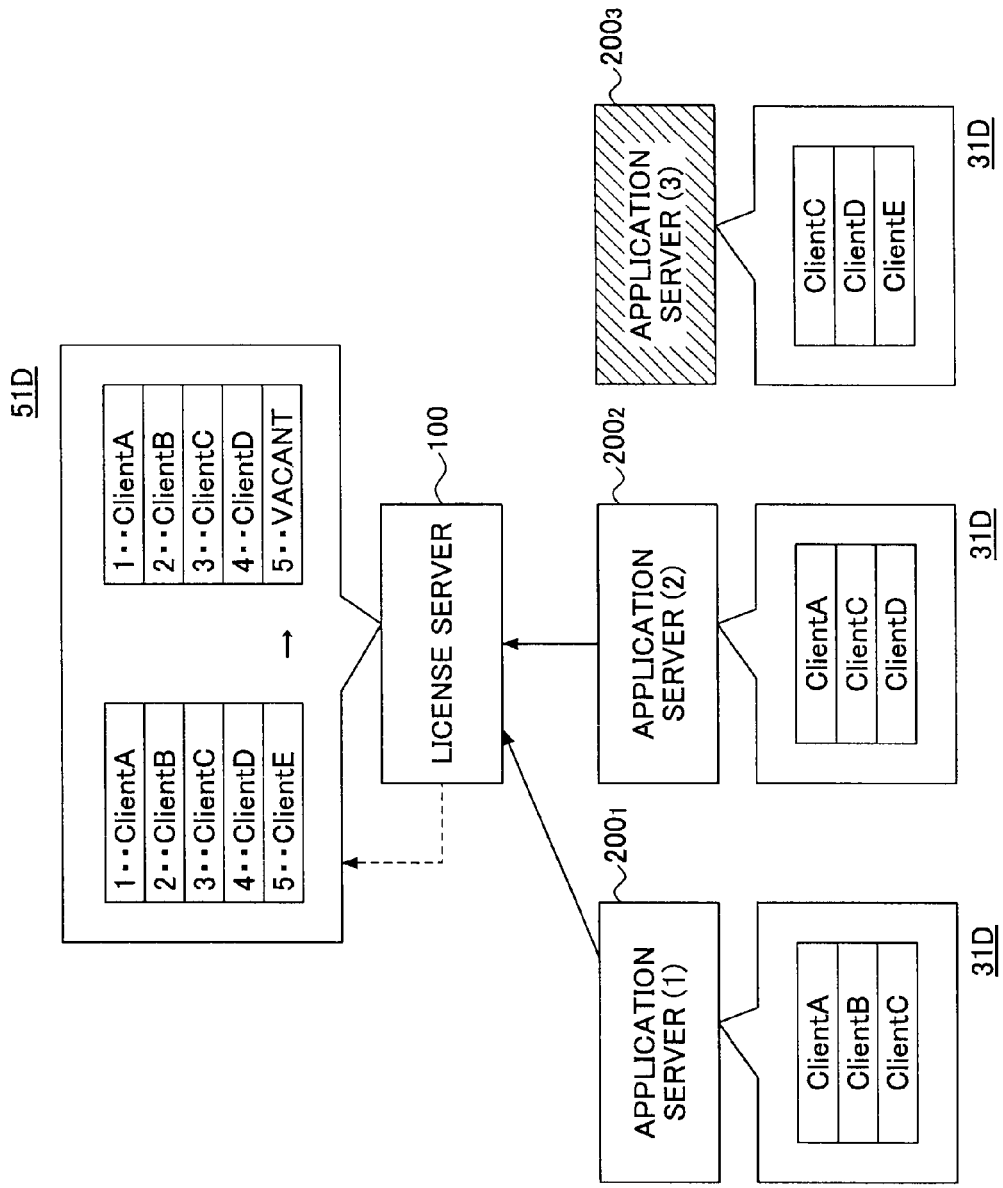
FIG. 16 indicates an operation example of license management in which an application server breaks down.

FIG. 16 indicates an operation example of license management in which the application server 200 breaks down. FIG. 16 indicates an operation example in which an application server (3) $200_3$ breaks down among three application servers (1) $200_1$, (2) $200_2$, and (3) $200_3$.

As shown in FIG. 16, clients A through E are set in the license related information 31D respectively included in the three application servers (1) $200_1$, (2) $200_2$, and (3) $200_3$.

Assuming that the application server (3) $200_3$ breaks down, a request for data crosscheck is not reported from the application server (3) $200_3$ to the license server 100. That is to say, the application server (3) $200_3$ does not send the license related information 31D in which the clients (C), (D), and (E) are set.

Accordingly, at the license server 100, data crosscheck with the license management information 51D is not performed for the client (E), because the client (E) is not set in the license related information 31D received together with the crosscheck requests from the application servers (1) $200_1$ and (2) $200_2$ which are operating normally. Accordingly, in the license management information 51D, the crosscheck record information corresponding to the client (E) is not updated.

Accordingly, in the periodic process, in the license server 100, the data corresponding to the client (E) whose crosscheck record information is not updated is deleted from the license management information 51D, and the connection license assigned to the client (E) is released.

As indicated in the above operation examples, in the license management system 1 where the license management information 51D is not updated in consideration of a breakdown of the application server 200 and communication failures between servers, even if the client 300 is connected to the application server 200, the connection license assigned to the corresponding client 300 is released in the license server 100, and therefore connection of the corresponding client 300 is rejected.

Accordingly, the license server 100 according to the present embodiment has a function of recording the processing results relevant to communication and data crosscheck with the application server 200.

Thus, in the license management system 1 according to the present embodiment, the license server 100 releases a connection license according to the communication status with the application server 200. Accordingly, in the license management system 1, when a client 300 is connected to an application server 200, it is possible to prevent a case where the connection license assigned to the client 300 is released and connection of the client 300 is rejected due to a server breakdown or a communication failure.

License Management Function

Figure 17:
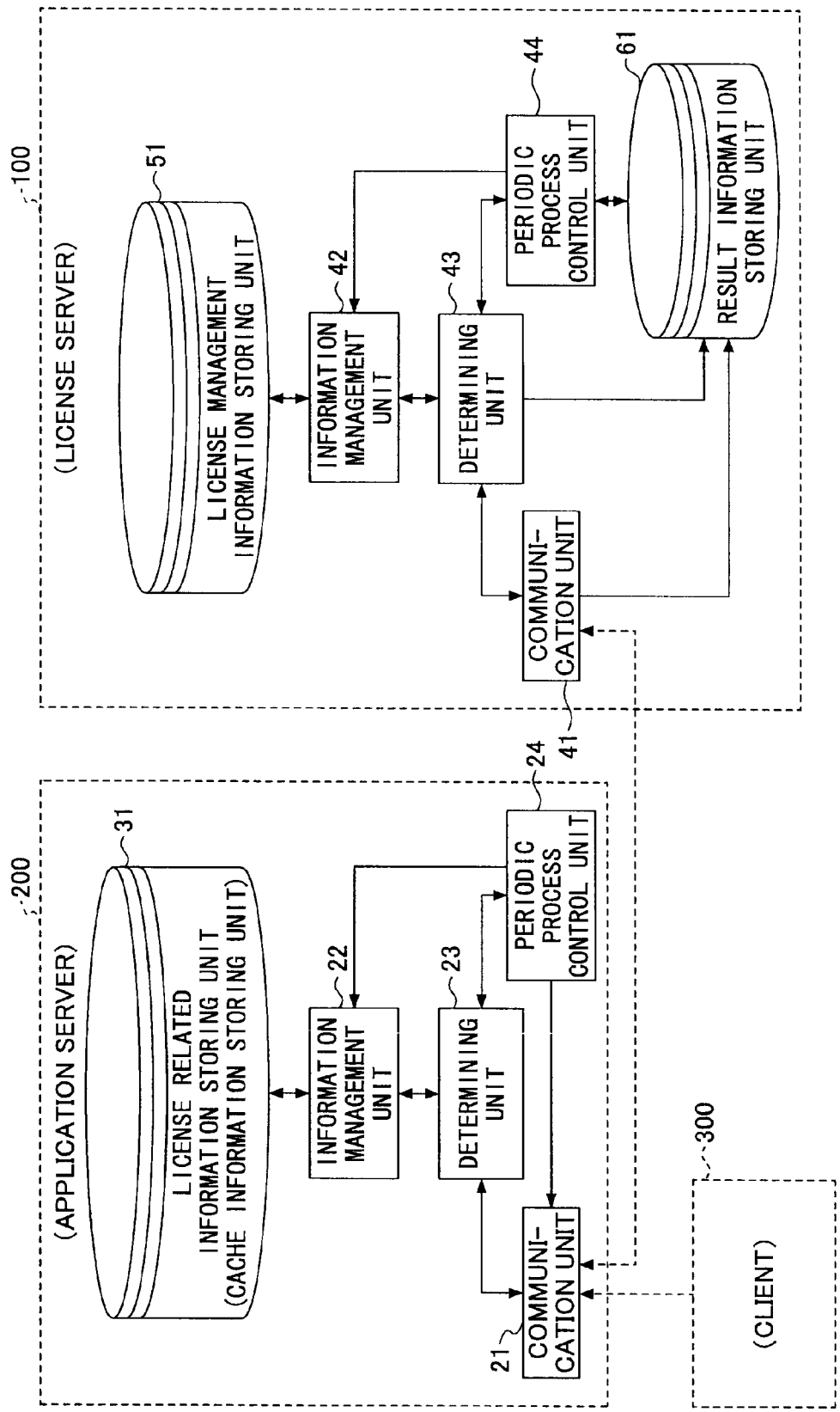
FIG. 17 illustrates an example of a functional configuration of the license management system according to a second embodiment of the present invention.
Figure 18:
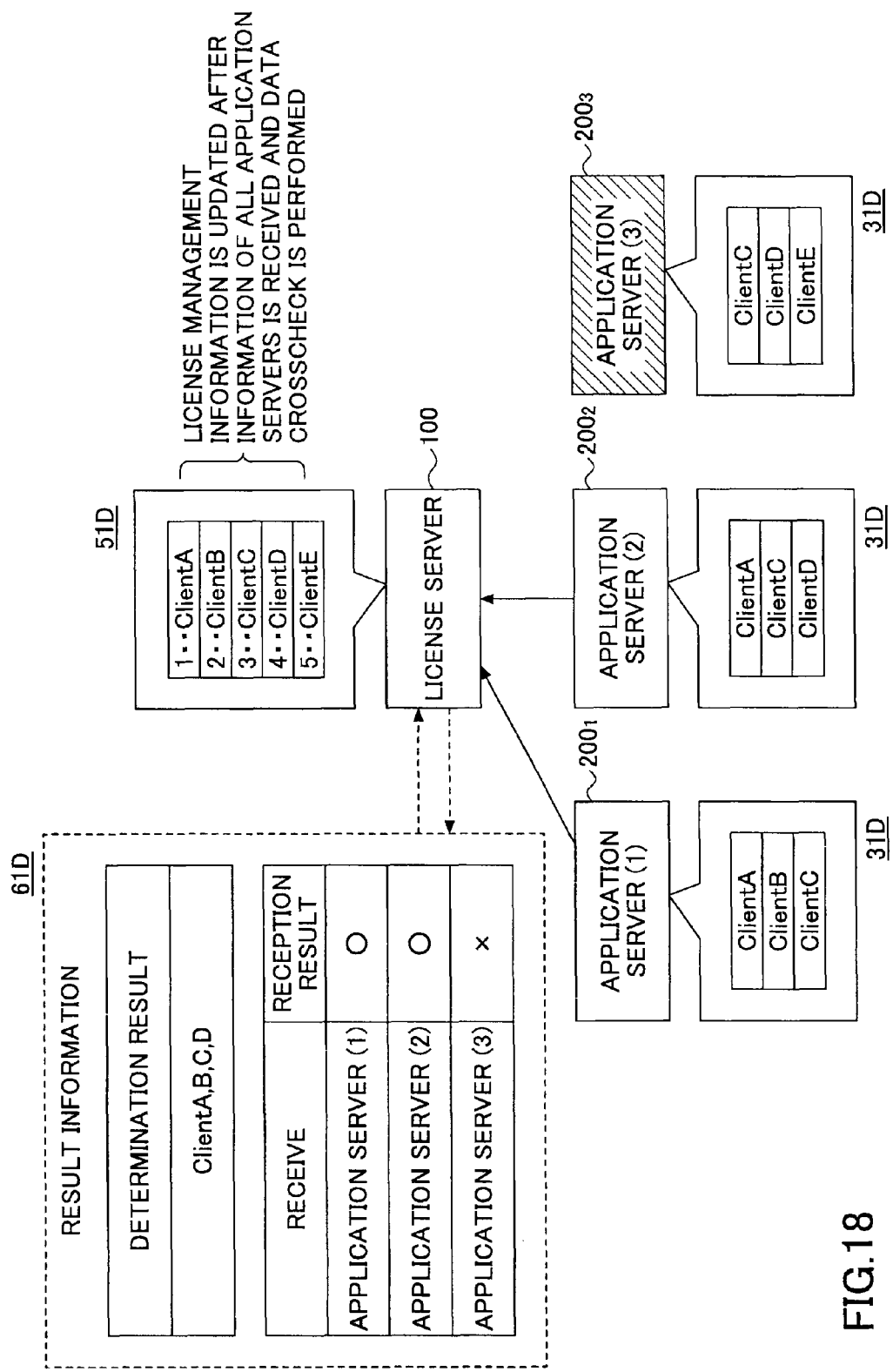
FIG. 18 indicates an operation example of license management according to the second embodiment of the present invention.

FIG. 17 illustrates an example of a functional configuration of the license management system 1 according to the present embodiment. FIG. 18 indicates an operation example of license management according to the present embodiment.

As shown in FIG. 17, the present embodiment is different from the first embodiment in that the license server 100 includes a result information storing unit 61.

The result information storing unit 61 corresponds to a predetermined storage area in the storage device (RAM) provided in the license server 100, and stores result information 61D as illustrated in FIG. 18.

The result information 61D includes information items such as communication results and crosscheck results. In communication result items, information indicating results of communication with the application server 200 is recorded (hereinafter, "communication result information"). Item values of the communication result items include reception results of the license related information 31D from the application server 200. In crosscheck result items, information indicating results of crosscheck between the license related information 31D and the license management information 51D is recorded (hereinafter, "crosscheck result information"). Examples include an entry (registration) confirmation result indicating whether each client set in the license related information 31D is entered (registered) in the license management information 51D.

Referring back to FIG. 17, the connection license is released by the periodic process control unit 44. The periodic process control unit 44 periodically accesses the license management information storing unit 51, and obtains, via the determining unit 43, a determination result indicating whether the crosscheck record information in the license management information 51D has been updated within a predetermined time period. When the periodic process control unit 44 confirms that there is a crosscheck record information item that has not been updated within a predetermined time period based on the determination result, the periodic process control unit 44 deletes, via the information management unit 42, data corresponding to the client 300 whose crosscheck record information has not been updated, from the license management information 51D. Accordingly, a connection license whose data is not crosschecked is released from the application server 200.

Then, the periodic process control unit 44 according to the present embodiment accesses the result information storing unit 61 in the periodic process, and updates the license management information 51D based on the result information 61D according to control by the information management unit 42 (deletes the corresponding data).

In the license server 100 according to the present embodiment, the reception result of the license related information 31D sent together with a crosscheck request from the application server 200 is recorded as communication result information in the result information 61D by the communication unit 41. Furthermore, in the license server 100, the data crosscheck result obtained by crosschecking the license related information 31D with the license management information 51D is recorded as crosscheck result information in the result information storing unit 61 by the determining unit 43.

The periodic process control unit 44 receives the license related information 31D from all of the application servers 200 in the license management system 1 based on the result information 61D recorded as above, and confirms whether data crosscheck between the license related information 31D and the license management information 51D has been performed. That is to say, the periodic process control unit 44 sets, as the update condition of the license management information 51D, the data crosscheck between the license related information 31D of all of the application servers 200 in the license management system 1 and the license management information 51D. Accordingly, if the update condition is not satisfied, the periodic process control unit 44 does not delete, from the license management information 51D, data corresponding to a client 300 whose crosscheck record information has not been updated.

In the following, a description is given of an update operation example of the license management information 51D in the license management system 1 according to the present embodiment, with reference to FIG. 18. FIG. 18 indicates an operation example in which an application server (3) $200_3$ breaks down among three application servers (1) $200_1$, (2) $200_2$, and (3) $200_3$.

In this case, in the license server 100, the communication unit 41 records communication report information in the result information 61D, indicating that license related information 31D is received from the application servers (1) $200_1$ and (2) $200_2$ but not from the application server (3) $200_3$. Furthermore, in the license server 100, the determining unit 43 records, as crosscheck result information in the result information storing unit 61, the data crosscheck results relevant to clients (A), (B), (C), and (D) set in the license related information 31D received from the servers (1) $200_1$ and (2) $200_2$. At this time, the license server 100 updates the crosscheck record information in the license management information 51D relevant to the clients (A), (B), (C), and (D) set in the servers (1) $200_1$ and (2) $200_2$ corresponding to the received license related information 31D.

In the license server 100, a periodic process is performed by the periodic process control unit 44, based on the result information storing unit 61 recorded as above. In the license server 100, the data of the license related information 31D of the application server (3) $200_3$ is not crosschecked with the data of the license management information 51D. Therefore, even if the crosscheck record information of the license management information 51D corresponding to the client (E) is not updated within a predetermined time period, the corresponding data is not deleted.

Modification of Second Embodiment

Furthermore, in the above license management system 1, the license server 100 may perform a periodic process and delete, from the license management information 51D, data corresponding to the client 300 whose crosscheck record information is not updated, in accordance with the elapsed time since communication becomes impossible (non-communication status).

Figure 19:
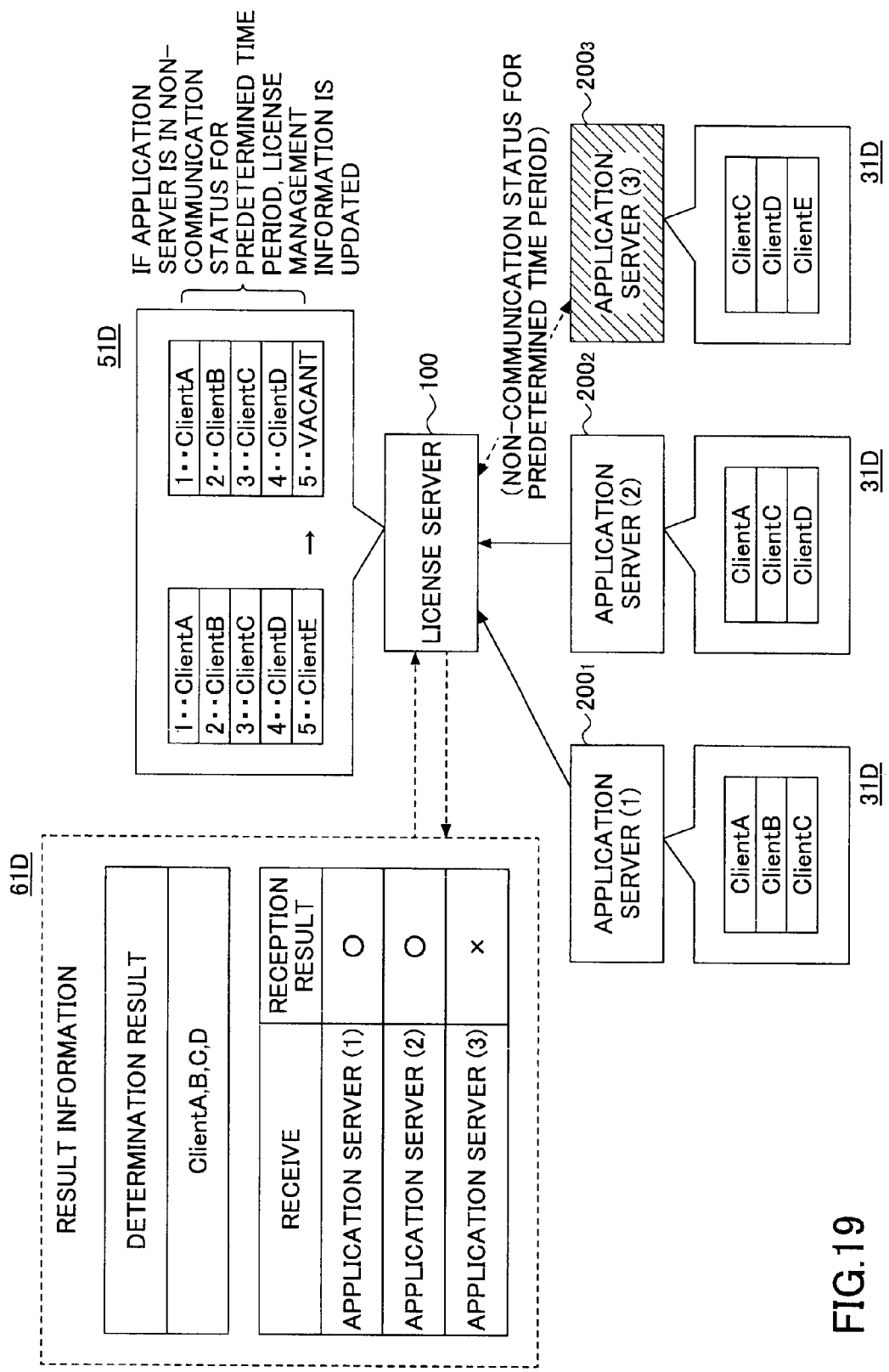
FIG. 19 indicates an operation example of license management according to a modification of the present invention.

FIG. 19 indicates an operation example of license management according to a modification of the present embodiment.

In the license server 100 according to the present modification, the periodic process control unit 44 confirms whether the application server 200 in a non-communication status shifts to a recovered status (a status where the cause of a failure is solved), among the application servers 200 in the license management system 1. Accordingly, if the license server 100 cannot confirm that the non-communication status of the application server 200 shifts to a recovered status within a time period set in advance, the license server 100 does not update the license management information 51D.

The periodic process control unit 44 identifies the application server (3) $200_3$ whose license related information 31D is not received by the license server 100 (the application server 200 that is in a non-communication status), based on the communication result information in the result information 61D. The periodic process control unit 44 issues/sends a predetermined information acquisition instruction to the identified application server (3) $200_3$ via the communication unit 41, and attempts to acquire the license related information 31D for a predetermined time period. If the license related information 31D cannot be acquired from the application server (3) $200_3$ during this time period, the periodic process control unit 44 confirms whether the crosscheck record information of the license related information 31D has been updated within a predetermined time period, and deletes, from the license management information 51D, data corresponding to the client (E) whose crosscheck record information has not been updated. Accordingly, a connection license whose data has not been crosschecked is released from the identified application server (3) $200_3$.

Overview of Second Embodiment

As described above, in the license management system 1 according to the present embodiment, the application server 200 and the license server 100 operate in coordination with each other to execute the management process of assigning a connection license to a client 300. Furthermore, in the license management system 1, the license server 100 has a function of recording processing results relevant to communication and data crosscheck with the application server 200, and releases a connection license in accordance with a communication status with the application server 200.

Accordingly, in the license management system 1 according to the present embodiment, the same effects as the first embodiment can be achieved, and even when the application server 200 breaks down or a failure occurs in communication between servers, the connection licenses can be appropriately managed in the license server 100.

In the embodiments described above, the license management function is implemented in the following manner. That is, the processing procedures described with reference to drawings are implemented as programs encoded in a programming language suited to the operation environment (platform) are executed by processing devices (e.g., CPU) of the respective devices (e.g., application management device and license management device) included in the license management system 1.

For example, in the case of the license server 100, the above programs can be stored in the computer-readable recording medium 103*a*. Accordingly, the programs can be installed in the license server 100 via the drive device 103. Furthermore, the license server 100 includes the interface device 107, and therefore the above programs can be downloaded with the use of a telecommunication line and installed in the license server 100.

The application server 200 has the same hardware configuration as the license server 100, and therefore the programs can be installed in the application server 200 by the methods described above.

Furthermore, in the above embodiments, when the license server 100 receives the license related information 31D from the application server 200, the data of the received license related information 31D is crosschecked with the data of the license management information 51D, and the crosscheck record information corresponding to the client 300 entered (registered) in the license management information 51D is updated. However, the present invention is not so limited. For example, in the periodic process, the license server 100 may update the crosscheck record information based on the crosscheck result and confirm whether the crosscheck record information has been updated. In this case, even if the license server 100 has acquired the license related information 31D several times from the application server 200 before the periodic process, the license server 100 performs the data crosscheck of the license management information storing unit 51 with the latest license related information 31D.

Furthermore, in the above embodiments, the application server 200 determines whether the client 300 requesting connection is a client 300 that is assigned with a connection license (i.e., manages connection licenses in units of clients). However, the present invention is not so limited. For example, the connection licenses may be managed in units of user accounts of users using the clients 300.

According to an aspect of the present invention, a license management system and a function providing device are provided, by which the function providing device and the license management device operate in coordination with each other to execute a management process of assigning a connection license to a client, so that the client can use functions provided by plural servers with a single connection license.

The present invention is not limited to the specific embodiments described herein, and variations and modifications may be made without departing from the scope of the present invention.

The present application is based on Japanese Priority Patent Application No. 2010-243126, filed on Oct. 29, 2010, the entire contents of which are hereby incorporated herein by reference.

What is claimed is:

1. A license management system comprising:
function providing devices configured to provide functions to an information processing device to be connected to the function providing devices; and
a license management device configured to manage connection licenses which allow the information processing device to use the functions of the function providing devices, wherein
the function providing devices and the license management device are connected by a predetermined data transmission path, wherein
each of the function providing devices includes
a connection device determination unit configured to determine, when a connection request is received from the information processing device, whether the information processing device making the connection request is an information processing device that is assigned with a connection license, and
a determination request sending unit configured to send a connection license assignment determination request to the license management device when the information processing device making the connection request is determined as not being an information processing device that is assigned with a connection license, wherein the license management device includes
a connection license determination unit configured to determine whether a connection license is assigned to the information processing device making the connection request, and
a determination result sending unit configured to send a determination result of the connection license determination unit to the function providing device making the connection license assignment determination request,
wherein
each of the function providing devices controls, via a processor, whether to authorize connection of the information processing device making the connection request based on a determination result of the connection device determination unit or the determination result sent by the determination result sending unit,
each of the function providing devices further includes a license related information storing unit configured to store, in memory, license related information in a predetermined storage area, the license related information including device identification information and connection record information set in association with each other, the device identification information identifying each information processing device that is assigned with a connection license and the connection record information indicating a connection date of a corresponding information processing device,
the connection device determination unit refers to the license related information stored in the license related information storing unit, and determines whether the information processing device making the connection request is an information processing device that is assigned with a connection license, based on whether the license related information includes the device identification information of the information processing device making the connection request,
the license management device further includes a license management information storing unit configured to store, in memory, license management information in a predetermined storage area, the license management information including license identification information and the device identification information set in association with each other, the license identification information identifying each connection license, the connection license determination unit refers to the license management information stored in the license management information storing unit, and determines whether a connection license is assigned to the information processing device making the connection request, based on whether the license management information includes the device identification information of the information processing device making the connection request, which device identification information is sent to the license management device from the determination request sending unit of the function providing device, each of the function providing devices further includes a connection confirmation unit configured to confirm whether there is an information processing device that has not been connected to the function providing device for a predetermined time period, the connection confirmation unit refers to the license related information stored in the license related information storing unit, and confirms, based on the connection record information, whether there is an information processing device that has not been connected to the function providing device for a predetermined time period among the information processing apparatuses set in the license related information, each of the function providing devices further includes a crosscheck request sending unit configured to send, to the license management device, a crosscheck request to crosscheck the license related information with the license management information, when the connection confirmation unit confirms that there is an information processing device that has not been connected to the function providing device for a predetermined time period, the function providing device deletes, from the license related information, the device identification information and the connection record information of the corresponding information processing device and updates the license related information, and the crosscheck request sending unit sends the updated license related information to the license management device, the license management device further includes a crosscheck confirmation unit configured to confirm whether there is an information processing device that has not undergone a crosscheck process of crosschecking the license management information with the license related information for a predetermined time period, the crosscheck confirmation unit refers to the license management information stored in the license management information storing unit, and confirms, based on the crosscheck record information, whether there is an information processing device that has not undergone the crosscheck process for a predetermined time period among the information processing apparatuses set in the license management information, and when the crosscheck confirmation unit confirms that there is an information processing device that has not undergone the crosscheck process for a predetermined time period, the license management device deletes, from the license management information, the device identification information and the crosscheck record information of the corresponding information processing device, and updates the license management information.

2. The license management system according to claim 1, wherein
in the license management device,
when the connection license determination unit determines that a connection license is assigned to the information processing device making the connection request,
the determination result sending unit sends the determination result of the connection license determination unit to the function providing device.

3. The license management system according to claim 1, wherein
the license management device further includes
a surplus license confirmation unit configured to confirm whether there is a surplus license that is not assigned to any information processing device, and
an assignment result sending unit configured to send a surplus license assignment result to the function providing unit, wherein
in the license management device,
when the connection license determination unit determines that a connection license is not assigned to the information processing device making the connection request,
the surplus license confirmation unit refers to the license management information stored in the license management information storing unit, and confirms whether there is a surplus license available to be assigned to the information processing device making the connection request, based on the license identification information, and
the assignment result sending unit sends the surplus license assignment result based on a confirmation result of the surplus license confirmation unit, to the function providing unit.

4. The license management system according to claim 3, wherein
when the surplus license confirmation unit confirms that there is a surplus license,
the license management device sets, in the license management information, the device identification information sent from the determination request sending unit of the function providing device and the license identification information of the surplus license confirmed by the surplus license confirmation unit in association with each other, and updates the license management information.

5. The license management system according to claim 1, wherein
when the connection device determination unit determines that the information processing device making the connection request is an information processing device that is assigned with a connection license,
the function providing device that has received the connection request updates the connection record information in the license related information and sends, to the information processing device making the connection request that, a report indicating that connection is authorized.

6. The license management system according to claim 3, wherein
when the function providing device receives, from the determination result sending unit of the license management device, the determination result indicating that a connection license is assigned to the information processing device making the connection request, or when the function providing device receives, from the assignment result sending unit of the license management device, the surplus license assignment result indicating that a surplus license is assigned to the information processing device making the connection request, the function providing device sets, in the license related information, the device identification information of the information processing device making the connection request and the connection record information, and sends, to the information processing device making the connection request that, a report indicating that connection is authorized.

7. The license management system according to claim 3, wherein when the function providing device receives, from the determination result sending unit of the license management device, the determination result indicating that a connection license is not assigned to the information processing device making the connection request, or when the function providing device receives, from the assignment result sending unit of the license management device, the surplus license assignment result indicating that a surplus license is not assigned to the information processing device making the connection request, the function providing device sends, to the information processing device making the connection request that, a report indicating that connection is not authorized.

8. The license management system according to claim 1, wherein in the license management information, crosscheck record information, which indicates a crosscheck date when the license management information is crosschecked with the license related information, is set in association with the license identification information and the device identification information, wherein the license management device further includes
a device register confirmation unit configured to confirm whether the information processing device set in the license related information is registered in the license management information, and
an update result sending unit configured to send an update result of the crosscheck record information to the function providing device, wherein the device register confirmation unit refers to the license management information stored in the license management information storing unit, and determines whether the information processing device set in the license related information is registered in the license management information, based on whether the license management information includes the device identification information in the license related information sent from the crosscheck request sending unit of the function providing device, and the update result sending unit sends, to the function providing device, the update result of the crosscheck record information based on a confirmation result of the device register confirmation unit.

9. The license management system according to claim 8, wherein when the device register confirmation unit confirms that the information processing device set in the license related information is registered in the license management information, the license management device sets the crosscheck date corresponding to a present date in the crosscheck record information of the corresponding information processing device included in the license management information, and updates the license management information.

10. The license management system according to claim 8, wherein in the license management device, when the device register confirmation unit confirms that the information processing device set in the license related information is not registered in the license management information, the surplus license confirmation unit refers to the license management information stored in the license management information storing unit and confirms, based on the license identification information, whether there is a surplus license available to be assigned to the information processing device confirmed as not being registered by the device register confirmation unit, and the assignment result sending unit sends the surplus license assignment result based on the confirmation result of the surplus license confirmation unit, to the function providing unit.

11. The license management system according to claim 8, wherein when the function providing device receives, from the update result sending unit of the license management device, the update result indicating that the crosscheck record information in the license management information is not updated, or when the function providing device receives, from the assignment result sending unit of the license management device, the surplus license assignment result indicating that the surplus license is not assigned to the information processing apparatus making the connection request, the function providing device deletes, from the license related information, the device identification information and the connection record information of the corresponding information processing device, and updates the license related information.

12. The license management system according to claim 1, wherein when the license management device receives the license related information from the crosscheck request units of all of the function providing devices in the license management system, the license management device deletes, from the license management information, the device identification information and the crosscheck record information of the information processing device that has not undergone the crosscheck process for a predetermined time period, and updates the license management information.

13. The license management system according to claim 1, wherein the license management device confirms a communication status between the license management device and the function providing device from which the license related information is not received, and when the communication status with the function providing device is not recovered within a predetermined time period, the license management device deletes, from the license management information, the device identification information and the crosscheck record information of the information processing device that has not undergone the crosscheck process for a predetermined time period, and updates the license management information.

14. A function providing device that provides a function to an information processing device, the function providing device being connected, by a predetermined data transmission path, to a license management device configured to manage a connection license which allows the information processing device to use the function of the function providing device, the function providing device comprising:

a connection device determination unit configured to determine, when a connection request is received from the information processing device, whether the information processing device making the connection request is an information processing device that is assigned with a connection license;

a determination request sending unit configured to send a connection license assignment determination request to the license management device when the information processing device making the connection request is determined as not being an information processing device that is assigned with a connection license; and a connecting unit configured to connect with the license management device, the license management device including a connection license determination unit configured to determine whether a connection license is assigned to the information processing device making the connection request, and a determination result sending unit configured to send a determination result of the connection license determination unit to the function providing device making the connection license assignment determination request, wherein the function providing device controls, via a processor, whether to authorize connection of the information processing device making the connection request based on a determination result of the connection device determination unit or the determination result received from the determination result sending unit of the license management device, wherein the function providing device further includes a license related information storing unit configured to store, in memory, license related information in a predetermined storage area, the license related information including device identification information and connection record information set in association with each other, the device identification information identifying each information processing device that is assigned with a connection license and the connection record information indicating a connection date of a corresponding information processing device, the connection device determination unit refers to the license related information stored in the license related information storing unit, and determines whether the information processing device making the connection request is an information processing device that is assigned with a connection license, based on whether the license related information includes the device identification information of the information processing device making the connection request, the license management device further includes a license management information storing unit configured to store, in memory, license management information in a predetermined storage area, the license management information including license identification information and the device identification information set in association with each other, the license identification information identifying each connection license, the connection license determination unit refers to the license management information stored in the license management information storing unit, and determines whether a connection license is assigned to the information processing device making the connection request, based on whether the license management information includes the device identification information of the information processing device making the connection request, which device identification information is sent to the license management device from the determination request sending unit of the function providing device, the function providing device further includes a connection confirmation unit configured to confirm whether there is an information processing device that has not been connected to the function providing device for a predetermined time period, the connection confirmation unit refers to the license related information stored in the license related information storing unit, and confirms, based on the connection record information, whether there is an information processing device that has not been connected to the function providing device for a predetermined time period among the information processing apparatuses set in the license related information, the function providing device further includes a crosscheck request sending unit configured to send, to the license management device, a crosscheck request to crosscheck the license related information with the license management information, when the connection confirmation unit confirms that there is an information processing device that has not been connected to the function providing device for a predetermined time period, the function providing device deletes, from the license related information, the device identification information and the connection record information of the corresponding information processing device and updates the license related information, and the crosscheck request sending unit sends the updated license related information to the license management device, the license management device further includes a crosscheck confirmation unit configured to confirm whether there is an information processing device that has not undergone a crosscheck process of crosschecking the license management information with the license related information for a predetermined time period, the crosscheck confirmation unit refers to the license management information stored in the license management information storing unit, and confirms, based on the crosscheck record information, whether there is an information processing device that has not undergone the crosscheck process for a predetermined time period among the information processing apparatuses set in the license management information, and when the crosscheck confirmation unit confirms that there is an information processing device that has not undergone the crosscheck process for a predetermined time period, the license management device deletes, from the license management information, the device identification information and the crosscheck record information of the corresponding information processing device, and updates the license management information.

15. A method implemented by a license management system, the method comprising:
providing, via function providing devices, functions to an information processing device to be connected to the function providing devices; and
managing, via a license management device, connection licenses which allow the information processing device to use the functions of the function providing devices, wherein
the function providing devices and the license management device are connected by a predetermined data transmission path, wherein
each of the function providing devices
determines, when a connection request is received from the information processing device, whether the information processing device making the connection request is an information processing device that is assigned with a connection license, and
sends a connection license assignment determination request to the license management device when the information processing device making the connection request is determined as not being an information processing device that is assigned with a connection license,
wherein the license management device
determines whether a connection license is assigned to the information processing device making the connection request, and
sends a determination result to the function providing device making the connection license assignment determination request,
wherein
each of the function providing devices controls, via a processor, whether to authorize connection of the information processing device making the connection request based on a determination result of whether a connection license is assigned to the information processing device making the connection request, or the sent determination result,
each of the function providing devices further stores, in memory, license related information in a predetermined storage area, the license related information including device identification information and connection record information set in association with each other, the device identification information identifying each information processing device that is assigned with a connection license and the connection record information indicating a connection date of a corresponding information processing device,
each of the function providing devices refers to the stored license related information, and determines whether the information processing device making the connection request is an information processing device that is assigned with a connection license, based on whether the license related information includes the device identification information of the information processing device making the connection request,
the license management device stores, in memory, license management information in a predetermined storage area, the license management information including license identification information and the device identification information set in association with each other, the license identification information identifying each connection license,
the license management device refers to the stored license management information, and determines whether a connection license is assigned to the information processing device making the connection request, based on whether the license management information includes the device identification information of the information processing device making the connection request, which device identification information is sent to the license management device from the function providing device,
each of the function providing devices confirms whether there is an information processing device that has not been connected to the function providing device for a predetermined time period,
each of the function providing devices refers to the stored license related information, and confirms, based on the connection record information, whether there is an information processing device that has not been connected to the function providing device for a predetermined time period among the information processing apparatuses set in the license related information,
each of the function providing devices sends, to the license management device, a crosscheck request to crosscheck the license related information with the license management information,
when the function providing device confirms that there is an information processing device that has not been connected to the function providing device for a predetermined time period, the function providing device deletes, from the license related information, the device identification information and the connection record information of the corresponding information processing device and updates the license related information, and sends the updated license related information to the license management device,
the license management device confirms whether there is an information processing device that has not undergone a crosscheck process of crosschecking the license management information with the license related information for a predetermined time period,
the license management device refers to the stored license management information, and confirms, based on the crosscheck record information, whether there is an information processing device that has not undergone the crosscheck process for a predetermined time period among the information processing apparatuses set in the license management information, and
when the license management device confirms that there is an information processing device that has not undergone the crosscheck process for a predetermined time period, the license management device deletes, from the license management information, the device identification information and the crosscheck record information of the corresponding information processing device, and updates the license management information.

* * * * *